US009303899B2

(12) United States Patent
Fu

(10) Patent No.: US 9,303,899 B2
(45) Date of Patent: Apr. 5, 2016

(54) SOLAR ENERGY-POWERED HEATING AND COOLING SYSTEM FOR BUILDINGS

(76) Inventor: Liming Fu, Wuhan (CN)

( * ) Notice: Subject to any disclaimer, the term of this patent is extended or adjusted under 35 U.S.C. 154(b) by 729 days.

(21) Appl. No.: 13/569,176

(22) Filed: Aug. 7, 2012

(65) Prior Publication Data

US 2012/0291768 A1 Nov. 22, 2012

Related U.S. Application Data

(63) Continuation-in-part of application No. PCT/CN2010/079287, filed on Nov. 30, 2010.

(30) Foreign Application Priority Data

Feb. 23, 2010 (CN) .......................... 2010 1 0112120

(51) Int. Cl.
| E04D 13/18 | (2014.01) |
| F24J 2/04 | (2006.01) |
| E04B 1/74 | (2006.01) |
| E04B 5/48 | (2006.01) |
| F24D 3/14 | (2006.01) |
| F24D 11/00 | (2006.01) |
| F24D 19/10 | (2006.01) |
| F24F 5/00 | (2006.01) |
| F24J 2/26 | (2006.01) |
| F24J 2/34 | (2006.01) |
| F24J 2/40 | (2006.01) |
| E04D 1/24 | (2006.01) |

(52) U.S. Cl.
CPC ................. *F24J 2/0444* (2013.01); *E04B 1/74* (2013.01); *E04B 5/48* (2013.01); *E04D 1/24* (2013.01); *F24D 3/142* (2013.01); *F24D 11/003* (2013.01); *F24D 19/1009* (2013.01); *F24F 5/0089* (2013.01); *F24J 2/045* (2013.01); *F24J 2/26* (2013.01); *F24J 2/34* (2013.01); *F24J 2/40* (2013.01); *F24D 2200/14* (2013.01); *F24J 2/0455* (2013.01); *Y02B 10/20* (2013.01); *Y02B 80/40* (2013.01); *Y02E 10/44* (2013.01)

(58) Field of Classification Search
CPC ............ F24D 3/14; F24D 3/146; Y02B 10/20
USPC .......... 126/623, 628, 633; 237/69; 165/53, 56
See application file for complete search history.

(56) References Cited

U.S. PATENT DOCUMENTS

| 6,457,288 | B2* | 10/2002 | Zambelli et al. ............. 52/220.2 |
| 7,010,893 | B2* | 3/2006 | Bernhardt ..................... 52/302.3 |
| 7,604,003 | B2* | 10/2009 | Merrett .......................... 126/563 |
| 2012/0193912 | A1* | 8/2012 | Baker et al. ...................... 290/2 |

FOREIGN PATENT DOCUMENTS

| GB | 000732148 A | * | 6/1955 |
| WO | WO 0194852 A1 | * | 12/2001 |

* cited by examiner

*Primary Examiner* — Kenneth Rinehart
*Assistant Examiner* — Gajanan M Prabhu
(74) *Attorney, Agent, or Firm* — Wayne & King LLC

(57) ABSTRACT

A solar energy-powered heating and cooling system for buildings, including solar energy tiles attached to a roof or an outside surface of walls of a building, an energy collector used to concentrate energy collected by the solar energy tiles, an energy converter activating solar energy into another form of energy, supply pipes hidden inside cavity floor and/or hollow walls and containing a flow medium, and an intelligent control unit. The solar energy collected by the solar energy tiles is brought to the energy collector and then converted via the energy converter. The energy is instilled into the flow medium that is subsequently transferred to the cavity floor and/or hollow walls via the supply pipes so as to either heat up or cool down the building. The process is controlled by the intelligent control unit.

6 Claims, 40 Drawing Sheets

SOLAR ENERGY-POWERED HEATING AND COOLING SYSTEM FOR BUILDINGS

CROSS-REFERENCE TO RELATED APPLICATIONS

This application is a continuation-in-part of International Patent Application No. PCT/CN2010/079287 with an international filing date of Nov. 30, 2010, designating the United States, now pending, and further claims priority benefits to Chinese Patent Application No. 201010112120.2 filed Feb. 23, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Dr., Suite 1319, Houston, Tex. 77079.

BACKGROUND OF THE INVENTION

1. Field of the Invention

The invention relates to a solar energy-powered heating and cooling system for buildings.

2. Description of the Related Art

Buildings have to consume energy in great quantities for heating and cooling, which lays a hidden danger for energy crisis. Solar energy is limitless, pure, and free from pollution. It is urgent to develop a solar energy-powered heating and cooling system applicable to buildings. Containing cavity components that are only equipped with heating pipes, traditional hollow heating floor panels can only heat up buildings through simple heat radiation, thus resulting in energy waste and less-satisfactory heating effect. Moreover, such floor panels are not related to collection, conversion, and storage etc. of solar energy, and have no function of cooling.

SUMMARY OF THE INVENTION

In view of the above-described problems, it is one objective of the invention to provide a solar energy-powered heating and cooling system for buildings.

To achieve the above objective, in accordance with one embodiment of the invention, there is provided a solar energy-powered heating and cooling system for buildings, comprising solar energy tiles attached to a roof or outside surface of walls of a building, an energy collector used to concentrate energy collected by the solar energy tiles, an energy converter activating solar energy into another form of energy (heat, light, sound, electrical, chemical, nuclear, or mechanical), supply pipes hidden inside cavity floor and/or hollow walls and containing a flow medium, and an intelligent control unit used to manipulate the abovementioned devices so as to realize the purpose of heating and cooling. Solar energy collected by the solar energy tiles are brought to the energy collector and then activated into another form of energy via the energy converter. The other form of energy is instilled into the flow medium that is subsequently transferred to the cavity floor and/or hollow walls via the supply pipes so as to either heat up or cool down the building. The whole process is controlled by the intelligent control unit.

Advantages of the invention are summarized below. The solar energy-powered heating and cooling system features low cost, applicability, energy conservation, and environmental protection, and can be used for all industrial and civil buildings so as to improve quality of both buildings and life.

BRIEF DESCRIPTION OF THE DRAWINGS

FIGS. 2a-2c are structural views of solar energy tiles, in which FIG. 2a is an axonometric drawing and cross section view of the solar energy tiles, FIG. 2b is a cross section view of the solar energy tiles with an internal insulation layer and FIG. 2c with an external insulation layer;

FIGS. 5a-5c are structural views of supply pipes, in which FIG. 5a is an axonometric drawing of the supply pipes, FIG. 5b is a cross section view of the supply pipes shrouded in square tubes and FIG. 5c is a cross section view of the supply pipes shrouded in circular tubes;

FIGS. 6a-6c are structural views of supply pipes, in which FIG. 6a is an axonometric drawing of the supply pipes, FIG. 6b is a cross section view of the supply pipes shrouded in square tubes and FIG. 6c shrouded in circular tubes;

FIGS. 14a-14d are structural views of cavity components situated in various locations of a cavity floor, in which FIG. 14a shows the cavity components in the upper part of the floor; FIG. 14b in the middle, FIG. 14c in the lower part, and FIG. 14d in the upper, middle, and lower parts;

FIGS. 18a-18d are structural views of cavity components situated in various locations of a hollow wall, in which FIG. 18a shows the cavity components in the outside of the wall; FIG. 18b in the inside, FIG. 18c in the belly, and FIG. 18d in the inside, belly and outside;

FIGS. 24a-24b are structural views of a cavity floor with capillary holes, in which FIG. 24a is a structural view of a cavity floor with capillary holes in one side and FIG. 24b with capillary holes in both sides;

FIGS. 25a-25b are structural views of a hollow wall with capillary holes, in which FIG. 25a is a structural view of a hollow wall with capillary holes in one side and FIG. 25b with capillary holes in both sides.

DETAILED DESCRIPTION OF THE EMBODIMENTS

For further illustrating the invention, experiments detailing a solar energy-powered heating and cooling system for buildings are described below. It should be noted that the following examples are intended to describe and not to limit the invention.

Figure 1:
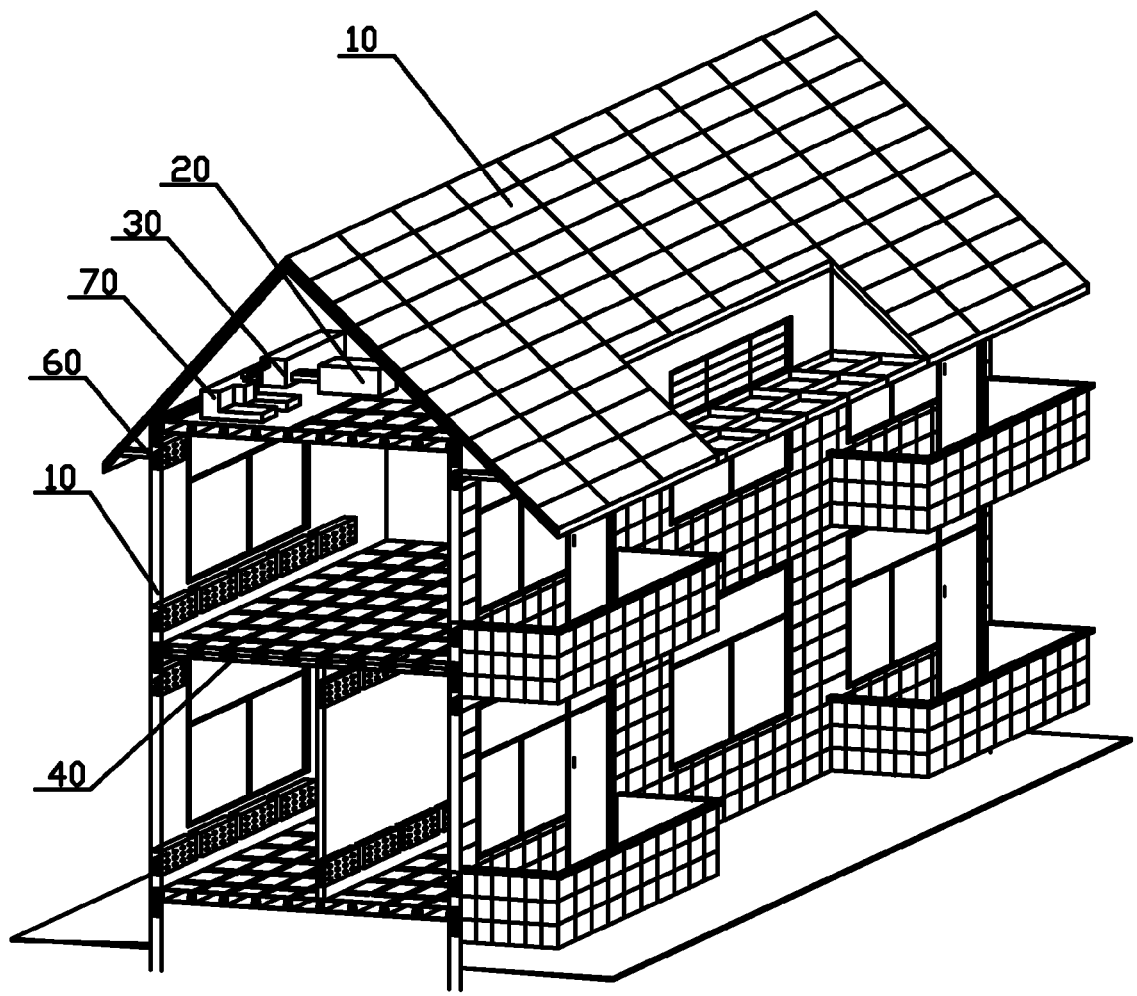
FIG. 1 is an axonometric drawing of a solar energy-powered heating and cooling system for buildings in accordance with one embodiment of the invention.

Referring to FIG. 1, a solar energy-powered heating and cooling system for buildings comprises solar energy tiles 10, an energy collector 20 used to concentrate energy collected by the solar energy tiles 10, an energy converter 30 activating solar energy into another form of energy, supply pipes 60 hidden inside cavity floor 40 and/or hollow walls 50 and containing a flow medium (not shown in FIG. 1), and an intelligent control unit 70 used to manipulate the abovementioned devices so as to realize the purpose of heating and cooling. Solar energy collected by the solar energy tiles 10 are brought to the energy collector 20 and then activated into another form of energy via the energy converter 30. The energy is instilled into the flow medium that is subsequently transferred to the cavity floor 40 and/or hollow walls 50 via the supply pipes 60 so as to either heat up or cool down the building. The whole process is controlled by the intelligent control unit 70.

Figure 2A:
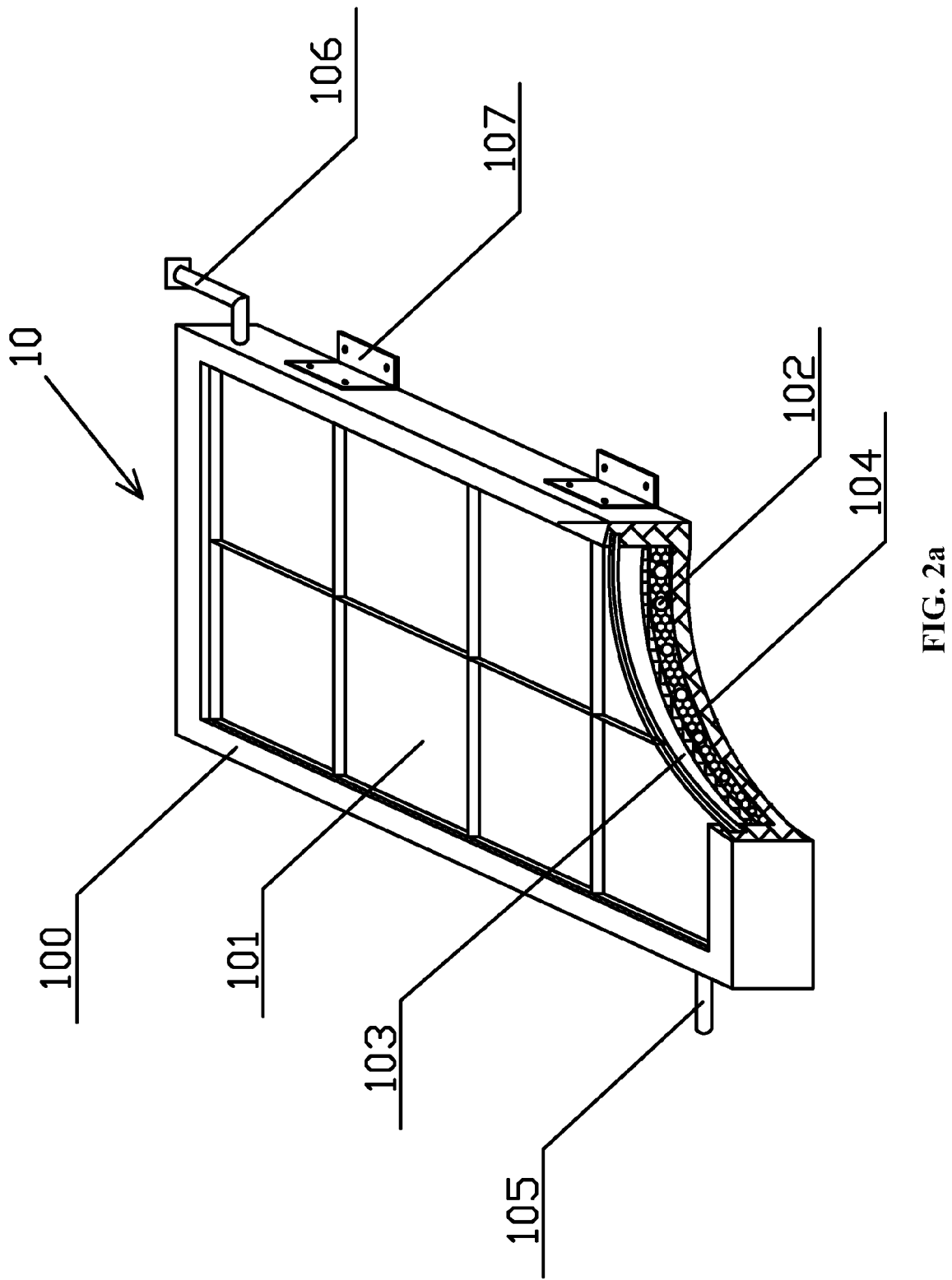
Figure 2B:
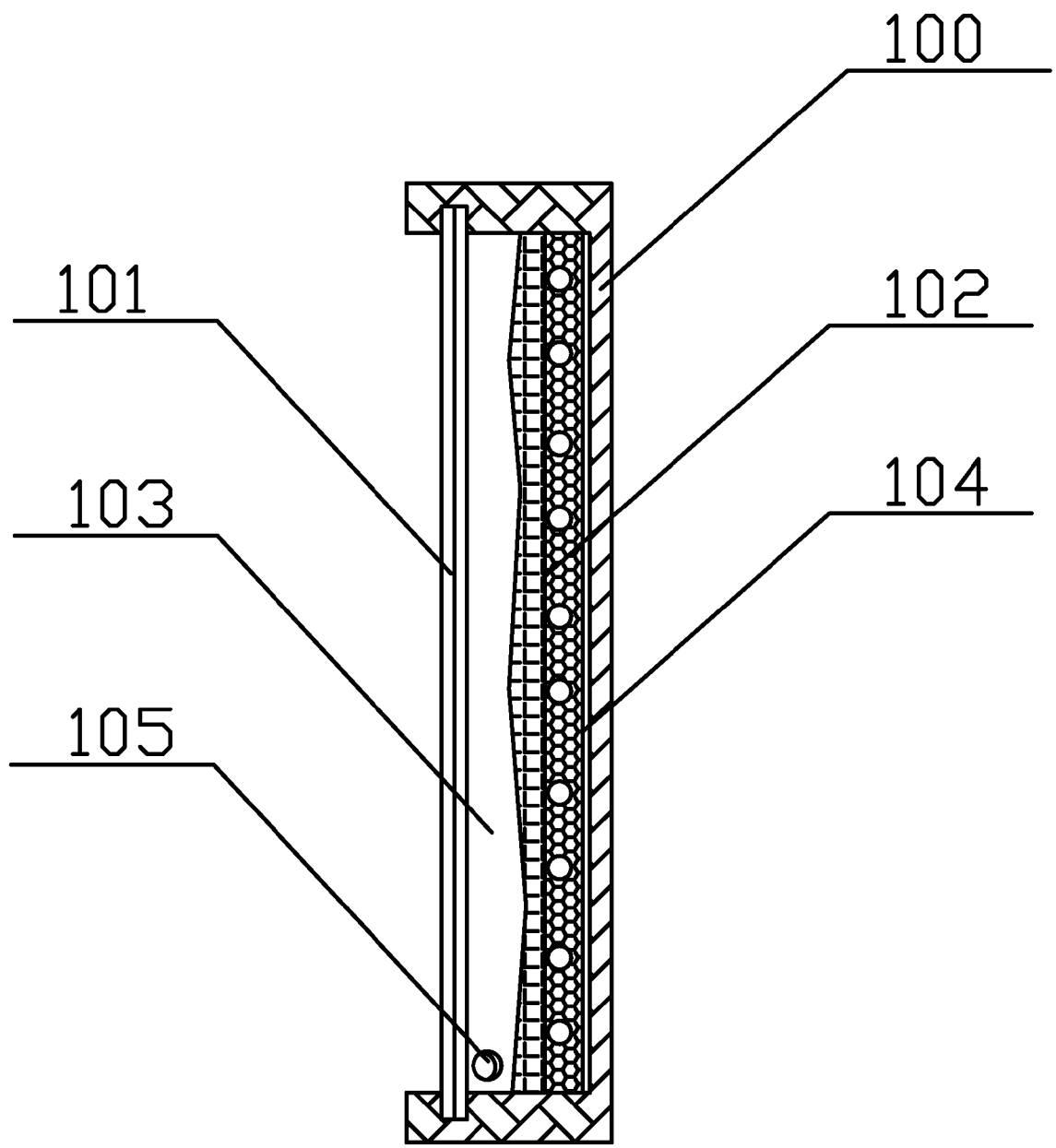

The solar energy tile 10 comprises a light collecting panel 101, an energy storage device 102, and a cavity 103 formed between the energy storage device 102 and the light collecting panel 101. Referring to FIGS. 2a-2b, the solar energy tile 10 comprises a holder 100 with a recess, the light collecting panel 101 set above the recess of the holder 100, the energy storage device 102 set underneath the recess of the holder 100 and the cavity 103 formed between the energy storage device 102 and the light collecting panel 101. Penetrating through the light collecting panel 101, sun lights heat up or activate the medium sealed off in the cavity 103, for example, air or other applicable materials, and the energy collected is automatically stored in the energy storage device 102. Preferably, an insulation layer 104 is configured between the energy storage device 102 and the bottom of the recess of the holder 100 so that the energy stored in the energy storage device 102 is prevented from losing easily.

Figure 2C:
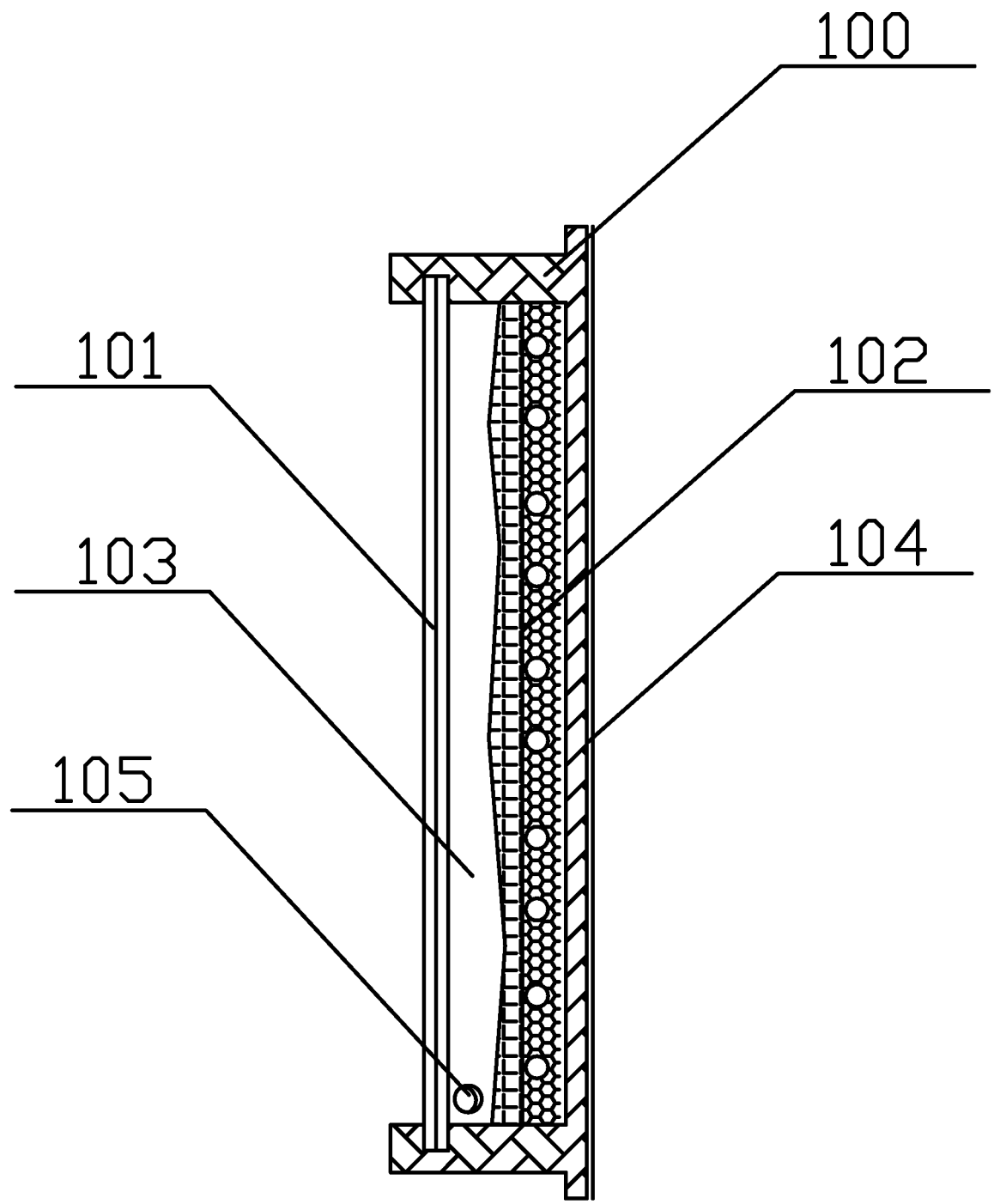

As shown in the example depicted by FIG. 2c, the insulation layer 104 is situated under the holder 100 so as to ensure the energy contained in the basis (i.e. outer wall) is retained to support the solar energy tiles 10. Alternatively, the insulation layer 104 can also be inserted between the energy storage device 102 and the recess of the holder 100 as well as under the holder 100.

Preferably, the solar energy tile 10 possesses at least one connector 105 on the at least one outer surface. Via the connector, multiple solar energy tiles 10 can be set up in series to collect energy.

The solar energy tile 10 is configured with an energy output 106 that functions to output energy stored in the energy storage device 102 and the cavity 103. When a batch of solar energy tiles 10 are put together via the connector 105, one or several energy outputs 106 can be installed to the solar energy tile block rather than connecting one output to each solar energy tile 10.

At least one fixer 107 is located in one side of the solar energy tile 10. With the fixer, one or more solar energy tiles 10 can be fixed to the basis, i.e. the outer wall or the roof top of a building. Alternatively, the fixer 107 can also be placed to the bottom of the solar energy tile 10.

Preferably, at least one of four lateral sides and bottom of the solar energy tile 10 is designed to be rough. When sticking the solar energy tiles 10 to a basis, the more rough the basis is, the stronger the bond between them becomes. Similarly, when two or more solar energy tiles 10 are put together, rough lateral surface can help to bind each other more tightly.

Figure 3:
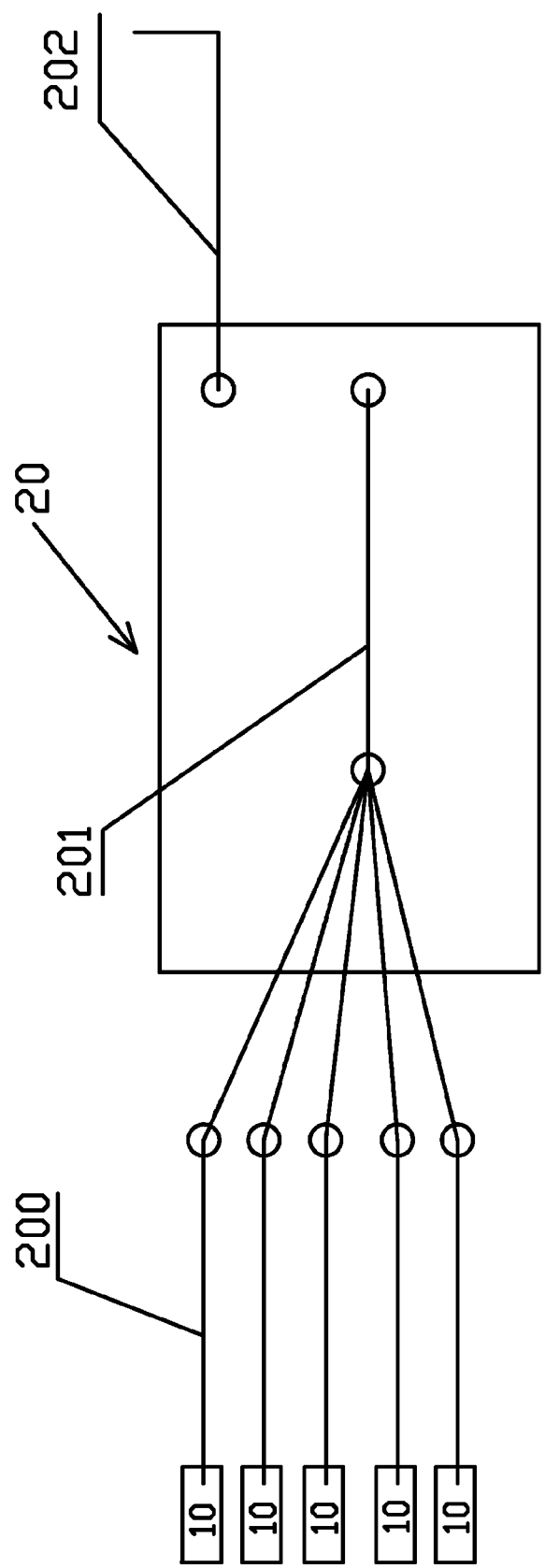
FIG. 3 shows a schematic diagram of an energy collector.

The energy connector as specified in FIG. 3 comprises an energy collecting pipe set 200 that is connected to the energy output 106 of the solar energy tiles 10, an energy depot 201 that is in connection with the energy collecting pipe set 200 and an energy output 202 that is linked to the energy depot 201 to channel its energy out. Solar energy collected by the solar energy tiles 10 is guided out via the energy output 106 and then saved in the energy depot 201 through the energy collecting pipe set 200 and finally distributed in line with requirements by the next steps by means of the energy output 202.

Figure 4:
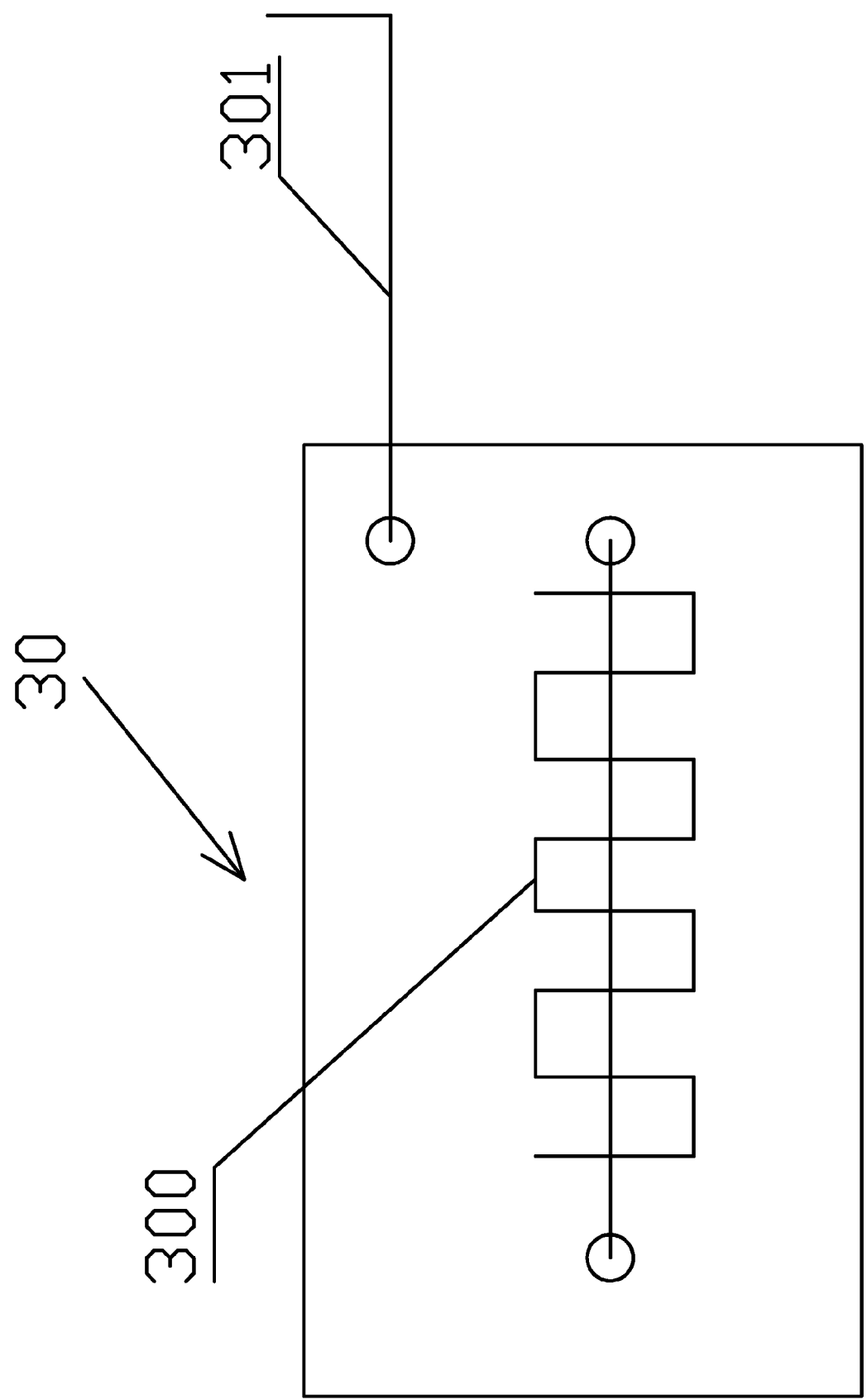
FIG. 4 shows a schematic diagram of an energy converter.

Referring to FIG. 4, the energy converter 30 comprises an energy converting unit 300 that is connected to the energy collector 20 via the energy output 202 and an energy output 301. The energy collector 20 employs the energy output 202 to feed energy into the energy converter 30 which, in turn, transfers the energy into heat via its converting unit 300 and then instilled into the flow medium via the energy output 301. The energy-carrying flow medium flows through the cavity floor 40 and/or hollow walls 50 by the supply pipes 60 to heat up the building. On the other hand, the energy can also be transformed into cold energy to cool down the building.

Figure 5A:
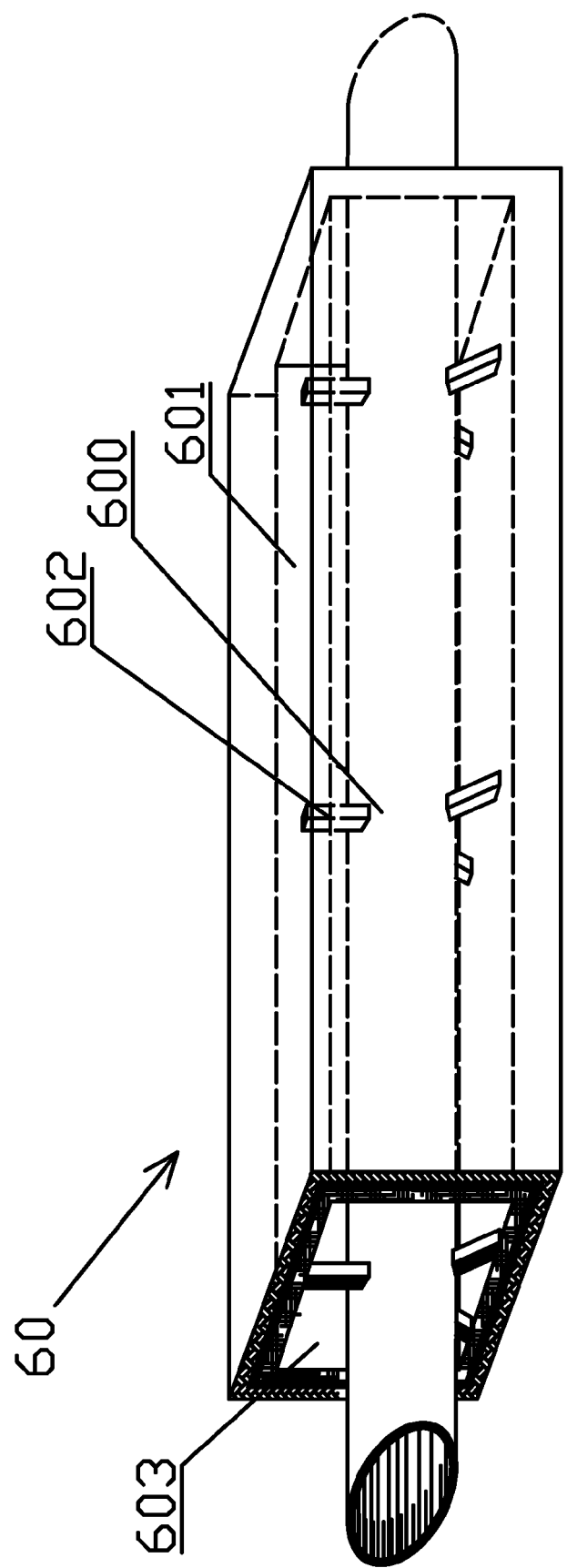
Figure 5B:
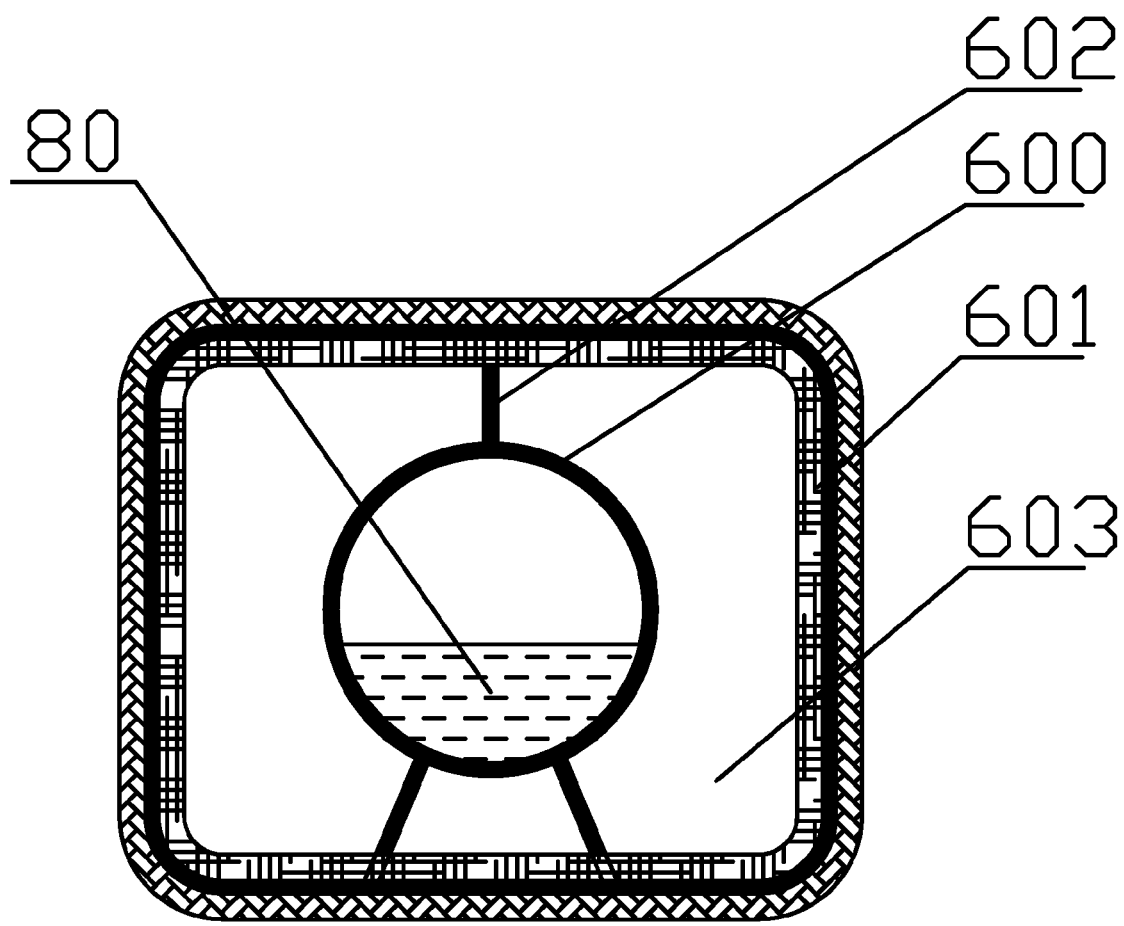
Figure 5C:
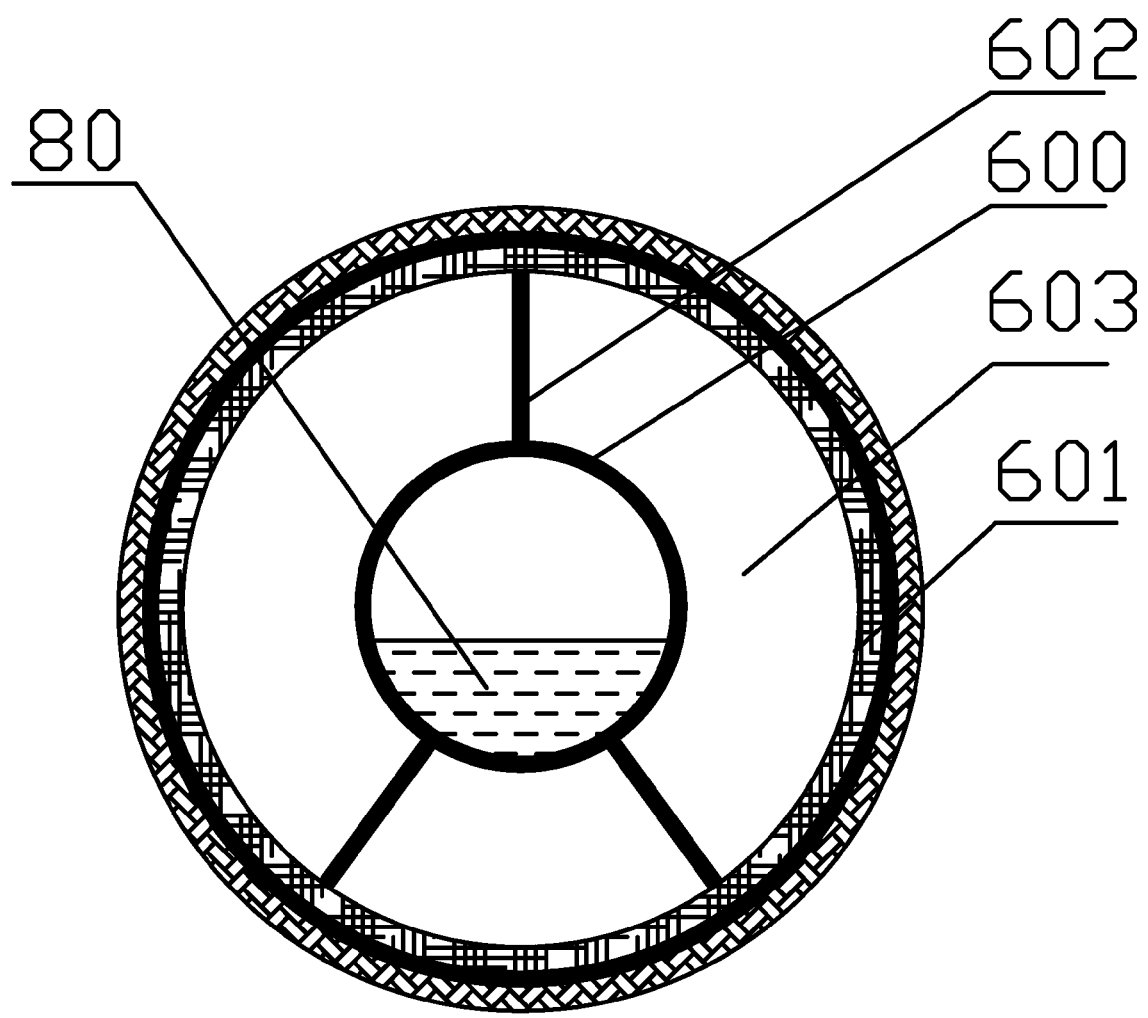

As shown in FIGS. 5a-5c, the supply pipe 60 comprises a core pipe 600, a sleeve 601 outside the core pipe 600, a connector 602 used to connect the sleeve 601 and core pipe 600 together and an air cavity 603 existing therebetween. The core pipe 600 transfers the flow medium 80 to realize heating and cooling, the sleeve 601 safeguards the core pipe 600 and the air cavity 603 formed between them assists to conserve energy and insulate on top of preventing the flow medium 80 from damaging the sleeve 601 when it is too cold or hot. Referring to FIG. 5b, the sleeve 601 of the supply pipe 60 is designed into a square column for indoor or outdoor installation in an open manner and referring to FIG. 5c, the sleeve 601 of the supply pipe 60 is designed into a cylindrical column for indoor installation in a hidden manner.

Figure 6A:
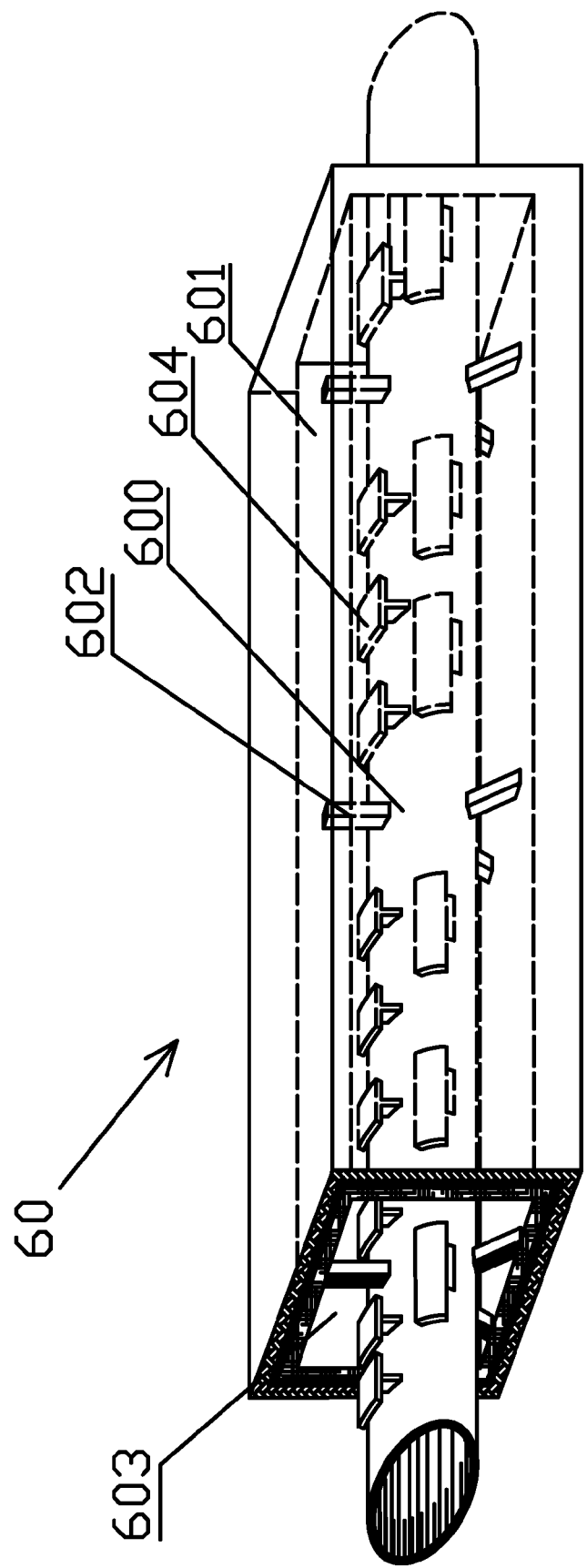
Figure 6B:
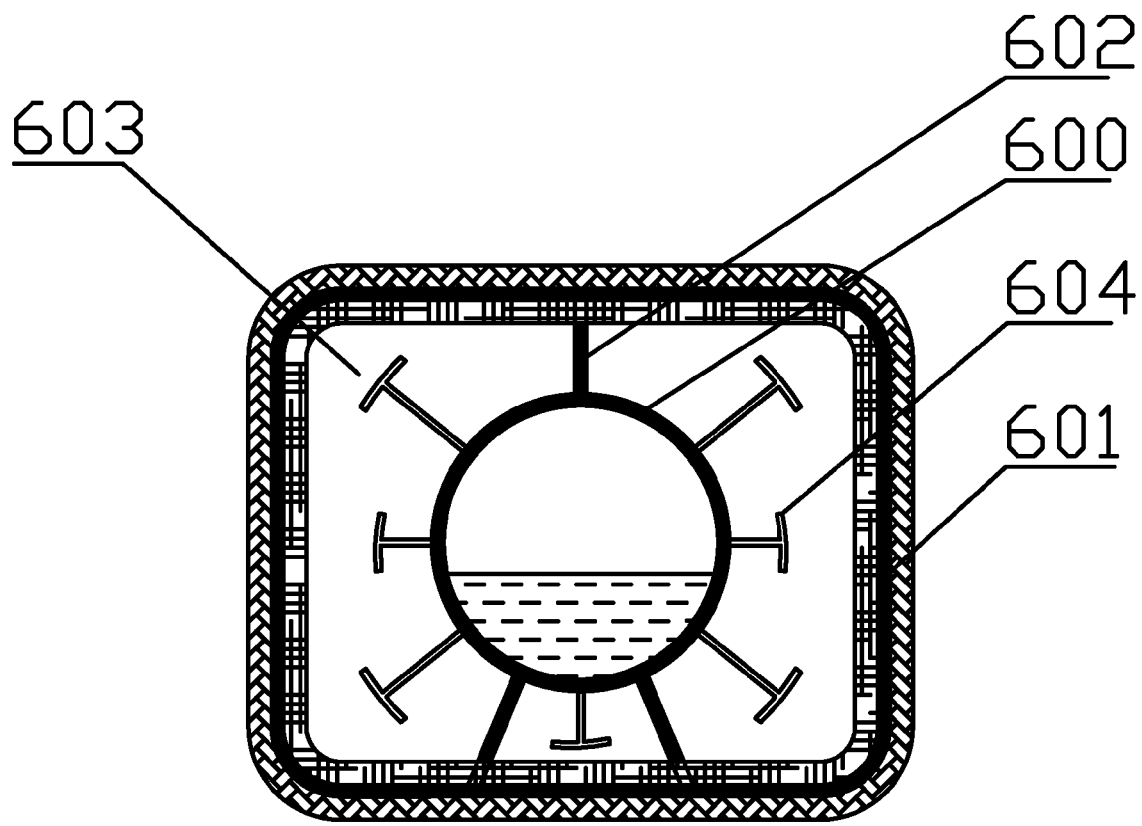
Figure 6C:
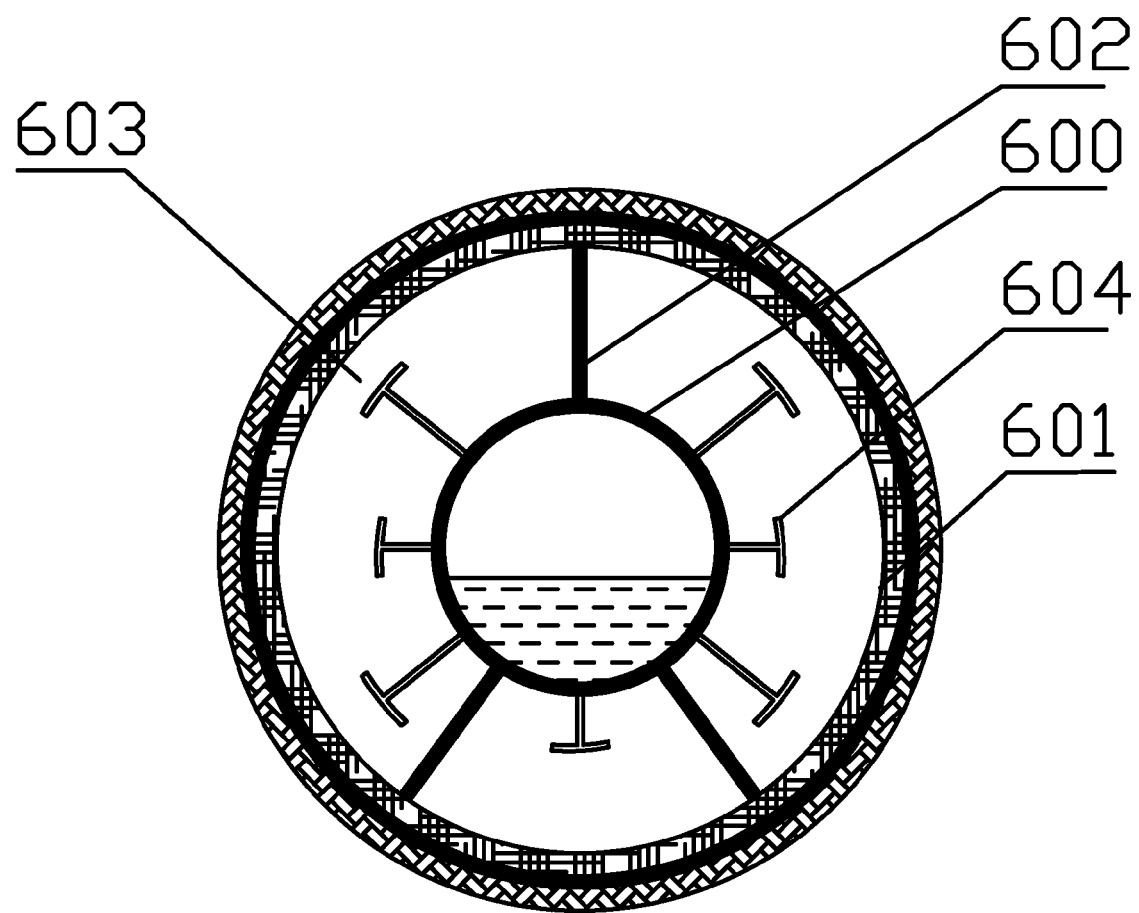

As shown in FIG. 6a, the supply pipe 60 comprises a core pipe 600, a sleeve 601 outside the core pipe 600, a connector 602 used to connect the sleeve 601 and core pipe 600 together and an air cavity 603 existing therebetween, and capillary pipes or sheets 604 attached to the outside of the core pipe 600. The density and size of the capillary pipes or sheets 604 can be adjusted to radiate either heat or cold energy carried by the flow medium 80 in the core pipe 600, thus tuning the temperature of the air cavity 603. FIG. 6b shows the structure of the supply pipe 60 with a sleeve 601 in the shape of square column, and at the same time, FIG. 6c shows the structure of the supply pipe 60 with a sleeve 601 in the shape of cylindrical column.

Figure 7:
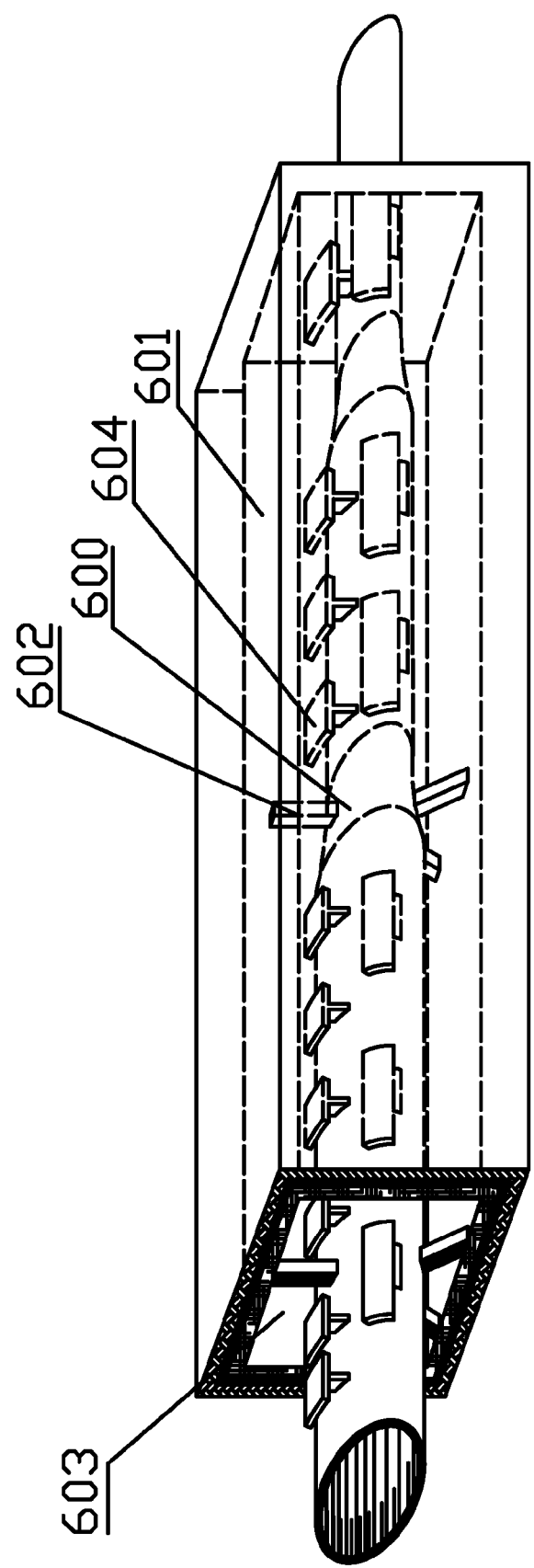
FIG. 7 is an axonometric drawing of supply pipes with a diameter-changeable core pipe.

As shown in FIG. 7, the core pipe 600 of the supply pipe 60 contracts or expands its diameter along the direction of the flow medium 80 in accordance with demands in connection with heat/cold energy. While conveying hot flow medium, the pressure of the core pipe 600 drops gradually as the number of branches increases. Under the circumstances, the core pipe contracts its diameter to compensate insufficient pressure. While conveying cold flow medium, the core pipe expands its diameter on the contrary to facilitate conveyance. However, the core pipe 600 can keep its diameter the same so as to facilitate manufacture and installation of the supply pipe 60.

Preferably, the cross section of the air cavity 603 formed between the core pipe 600 and outside pipe 601 is variable. An air cavity with variable cross section collects and distributes energy, accordingly making it easier to heat up or cool down individual rooms and households.

Figure 8:
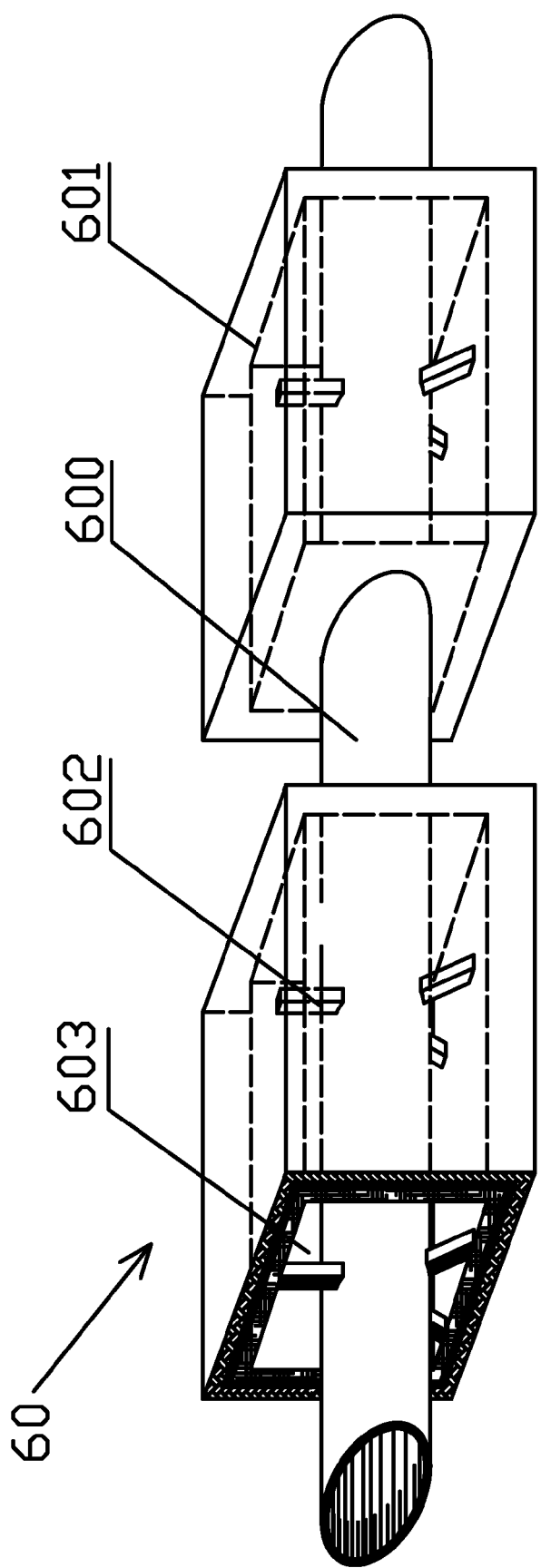
FIG. 8 shows air cavities connected in sections independently.
Figure 9:
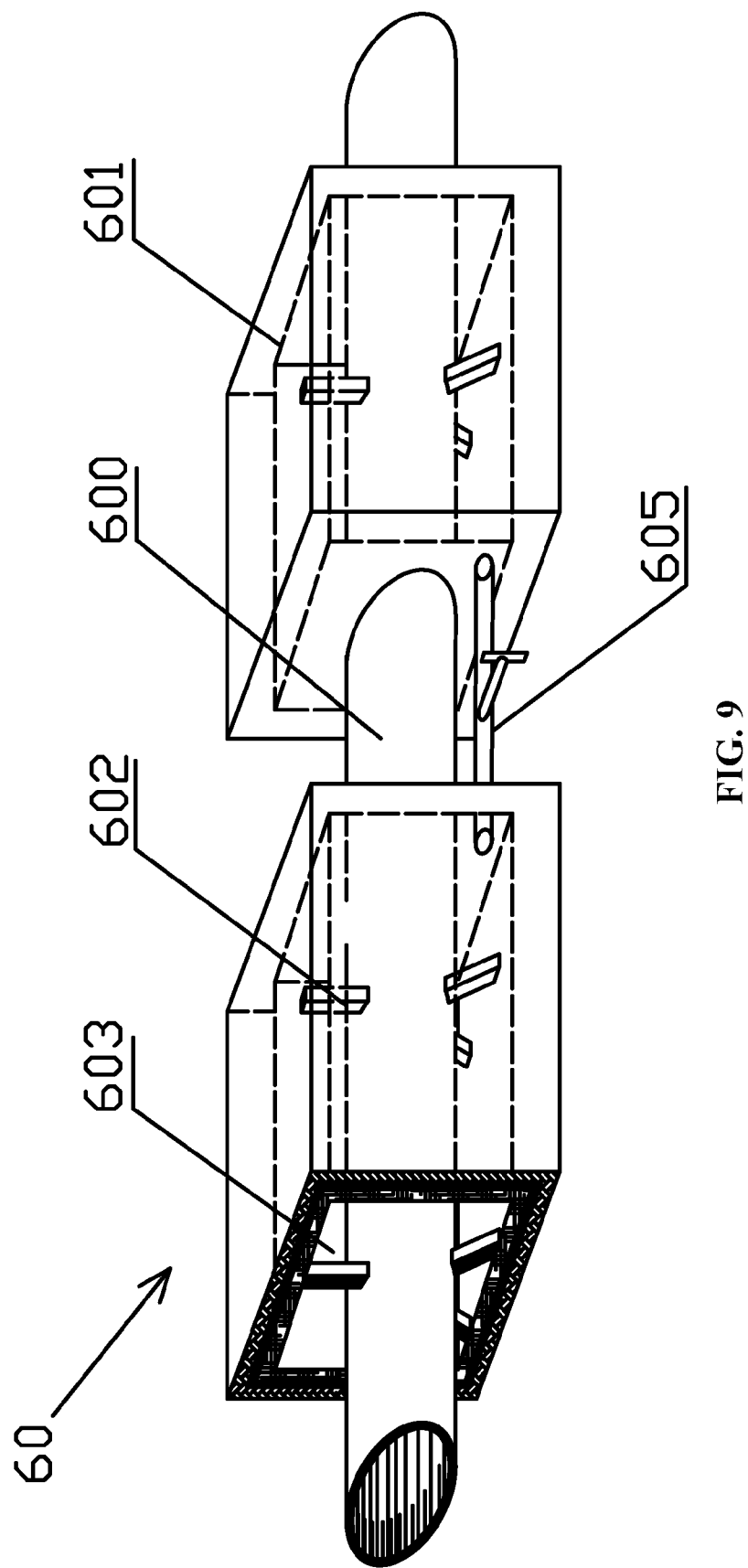
FIG. 9 shows air cavities connected in series.

Referring to FIG. 8, sleeves 601 are configured to the core pipe 600 along the direction of the flow medium 80 at certain intervals and an air cavity 603 is formed between them. Referring to FIG. 9, sleeves 601 are configured to the core pipe 600 along the direction of the flow medium 80 at certain intervals and an air cavity 603 is formed between them. Different air cavities are connected together via connecting pipes 605. The air cavity 603 is required by the heating or cooling demands of buildings to set up individually or in series.

Figure 10:
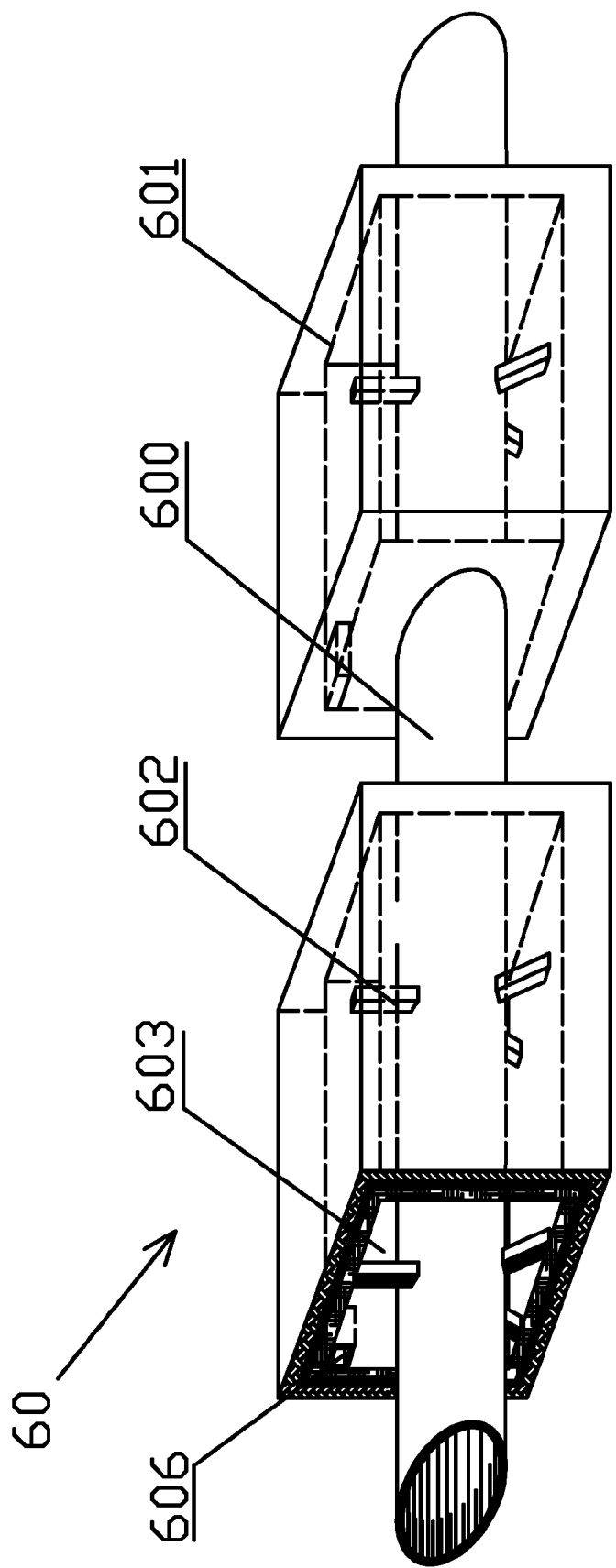
FIG. 10 shows air cavities with a pressurizer.

Referring to FIG. 10, a pressurizer 606 is set up in the air cavity 603. The pressurizer 606 is able to adjust the velocity of the air inside the air cavity 603 as well as the speed of air dispersion and radiation temperature of the air cavity 603 so as to make up for and change temperature fluctuation and energy loss due to long-distance conveyance and help to solve the issue concerning energy transfer and control between rooms.

Figure 11:
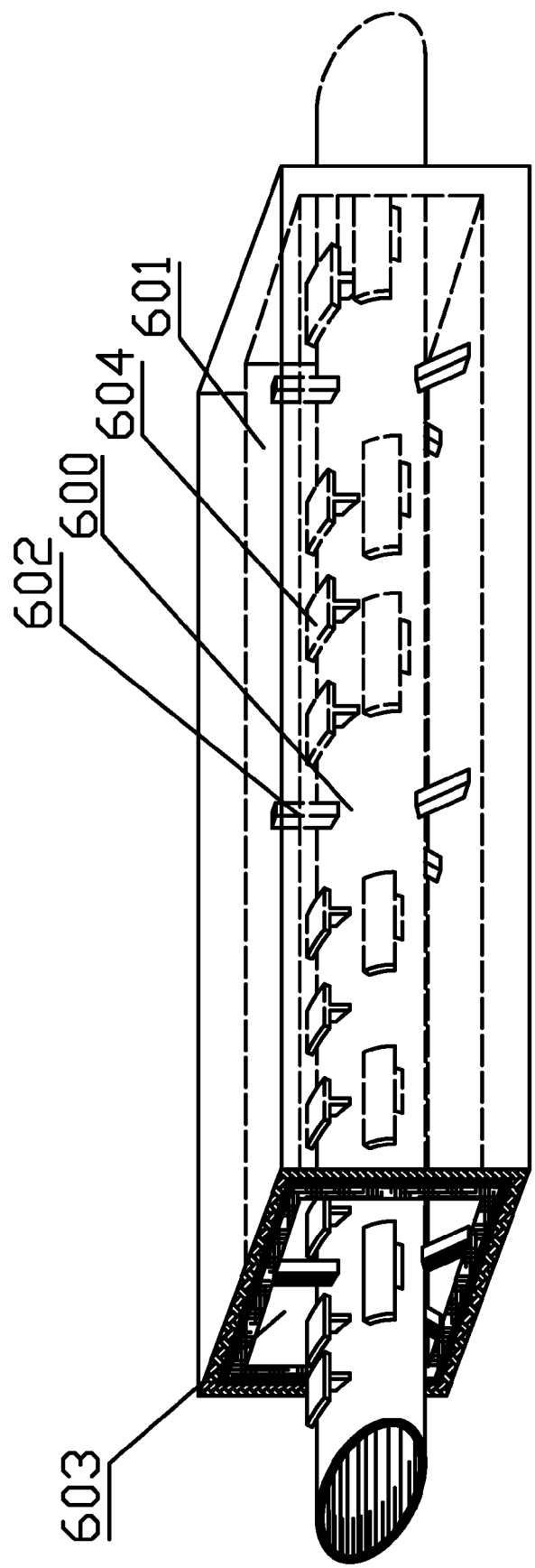
FIG. 11 shows capillary pipes or sheets in an air cavity with changeable density and size.

As shown in FIG. 11, the capillary pipes or sheets 604 change its distribution density in ascending or descending order along the direction of the flow medium 80. Capillary pipes or sheets 604 in different densities and sizes disperse the heat/cold energy carried by the flow medium 80 inside the core pipe 600 to different degrees so as to adjust the temperature of the air cavity 603. The density and size of the capillary pipes or sheets 604 should be determined by heat/cold energy demands and is related to transport distance and pressure as well. Additionally, its density and size also fixes the average cross section variable of the air cavity 603, thus making the supply pipe 60 a type of pipe with variable cross section even if the outside pipe 601 remains its cross section unchanged.

Figure 12:
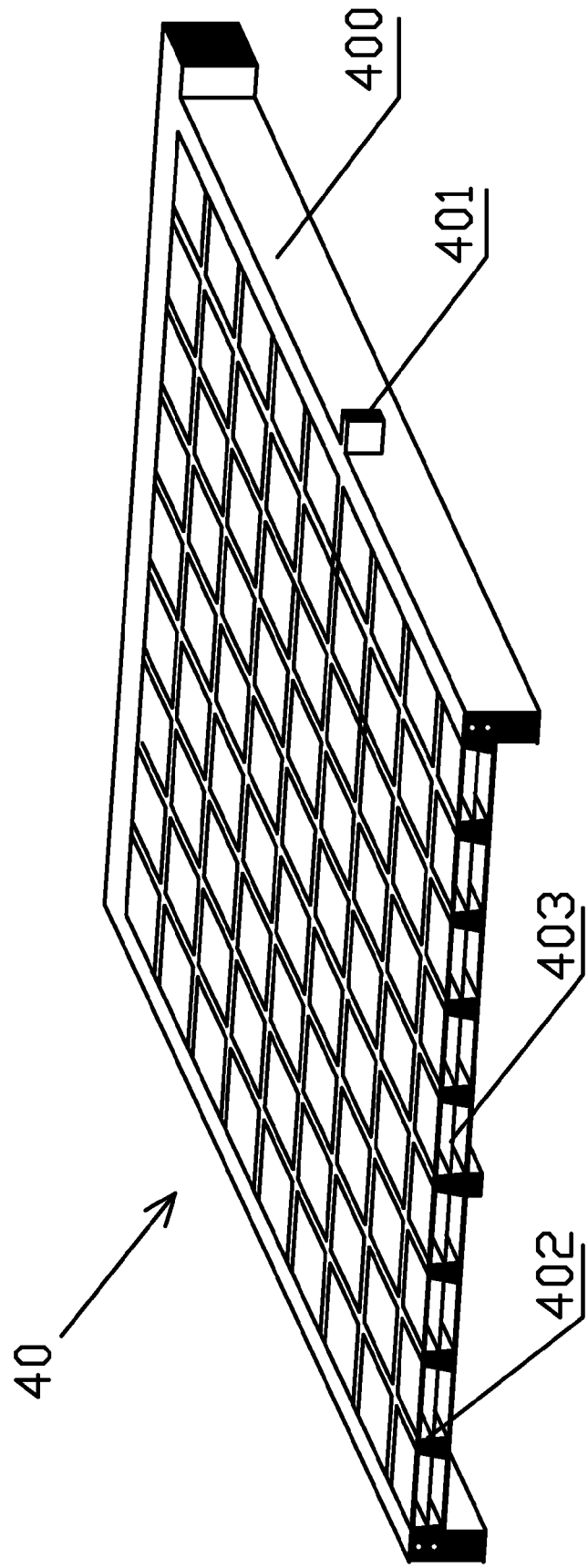
FIG. 12 is a structural view of a cavity floor.

FIG. 12 shows the structure of a cavity floor. The cavity floor 40 comprises main beams 400, secondary beams 401, multi-ribbed beams 402, and cavity components 403. The main beams 400 are connected end to end forming a frame, and the secondary beams 401 are set up between the main beams in a bidirectional crossing manner, and the multi-ribbed beams 402 between the secondary beams, and the cavity components 403 are set up between the multi-ribbed beams. In the example as shown in FIG. 12, the secondary beams 401 and the multi-ribbed beams 402 are respectively set up between the main beams and between the secondary beams in a bidirectional crossing manner. However, they can also be set up unidirectionally.

In another example, the cavity floor 40 comprises main beams 400, secondary beams 401 and cavity components 403. The main beams 400 are connected end to end forming a frame, and the secondary beams 401 are set up between the main beams in a bidirectional crossing manner or unidirectionally, and the cavity components 403 are set up between the multi-ribbed beams.

The main beams 400, the secondary beams 401 and the multi-ribbed beams 402 are but not limited to cast-in-situ reinforced concrete beams, shaped steel reinforced concrete beams and shaped steel beams from which one or more can be chosen. Nevertheless, at least one of the main beams 400, the secondary beams 401 and the multi-ribbed beams 402 belongs to either category mentioned above.

Figure 13:
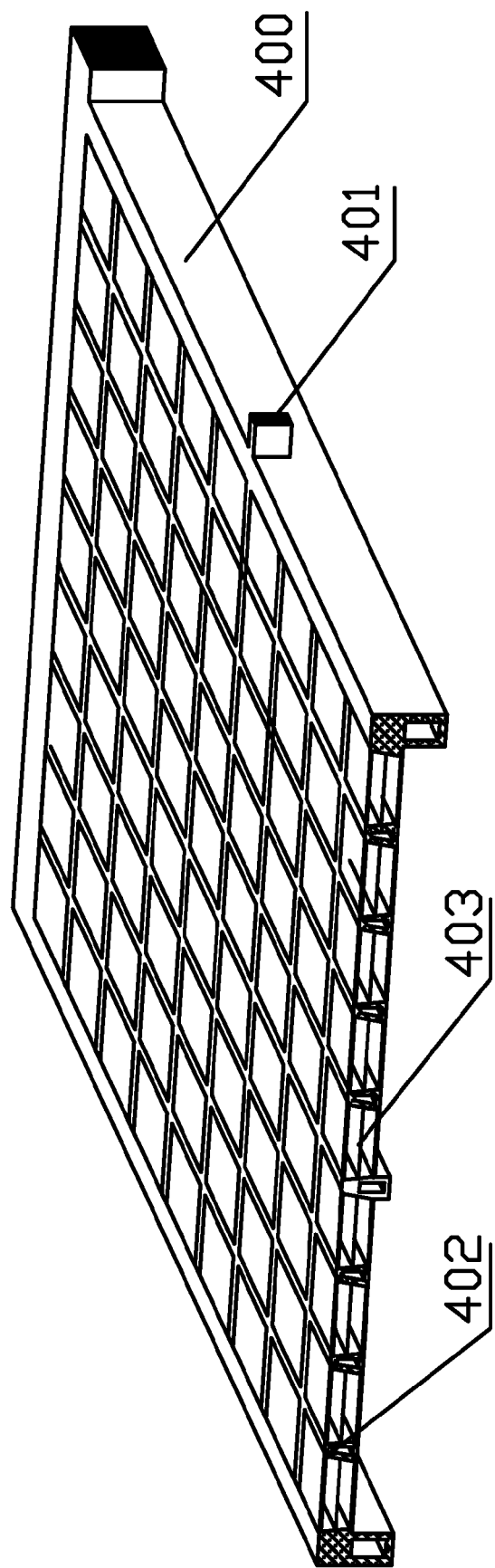
FIG. 13 is a structural view of hollow multi-ribbed beams, main and secondary beams constituting a cavity floor.

The main beams 400, the secondary beams 401 and the multi-ribbed beams 402 constituting the cavity floor 40 as shown in FIG. 13 are hollow in structure, thus reducing the consumption of construction materials, lightening the weight of the cavity floor 40 itself and enhancing the insulation capability of the cavity floor 40. FIG. 13 merely depicts the situation in which the main beams 400, the secondary beams 401 and the multi-ribbed beams 402 configured along one direction are hollow in structure and as for those along other direction, and they can be either hollow or solid in structure.

Figure 14A:
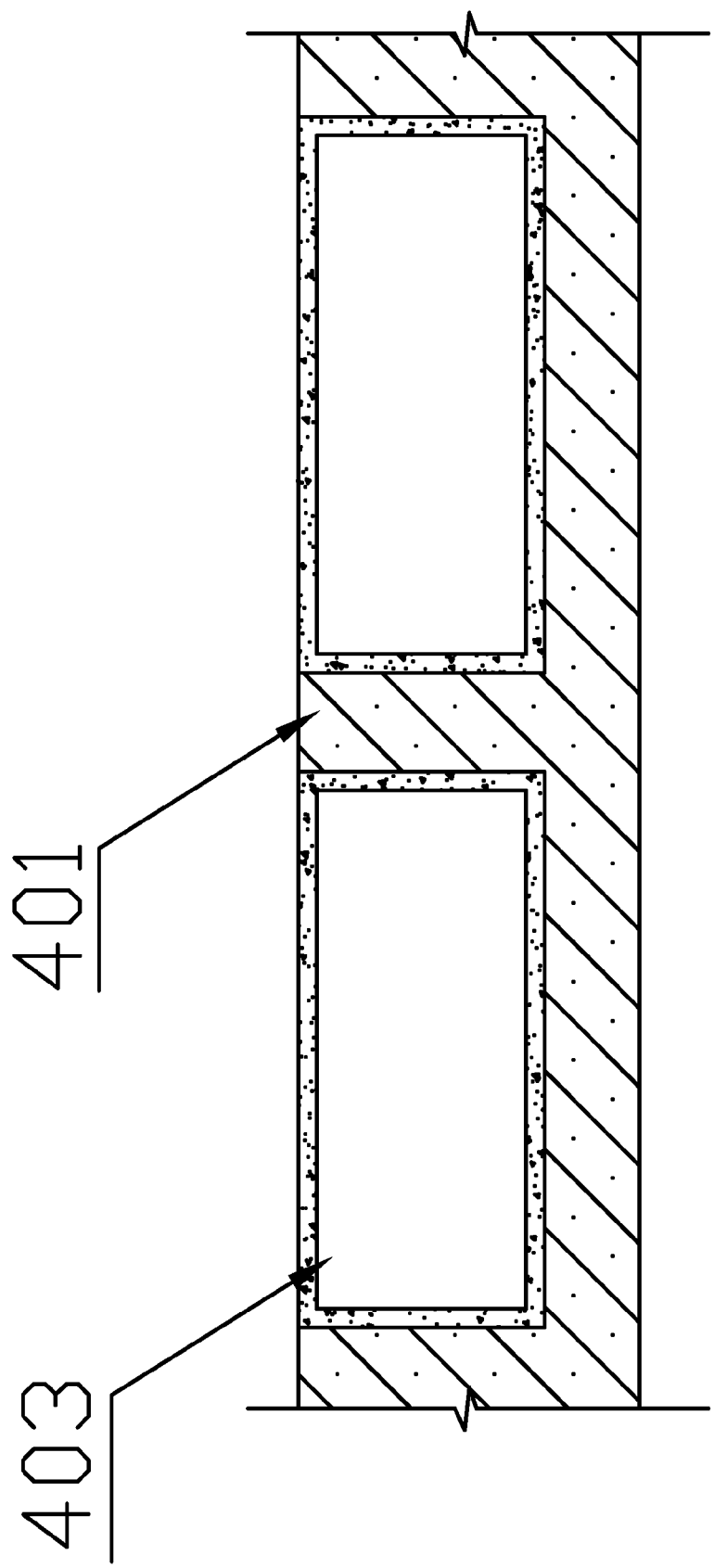
Figure 14B:
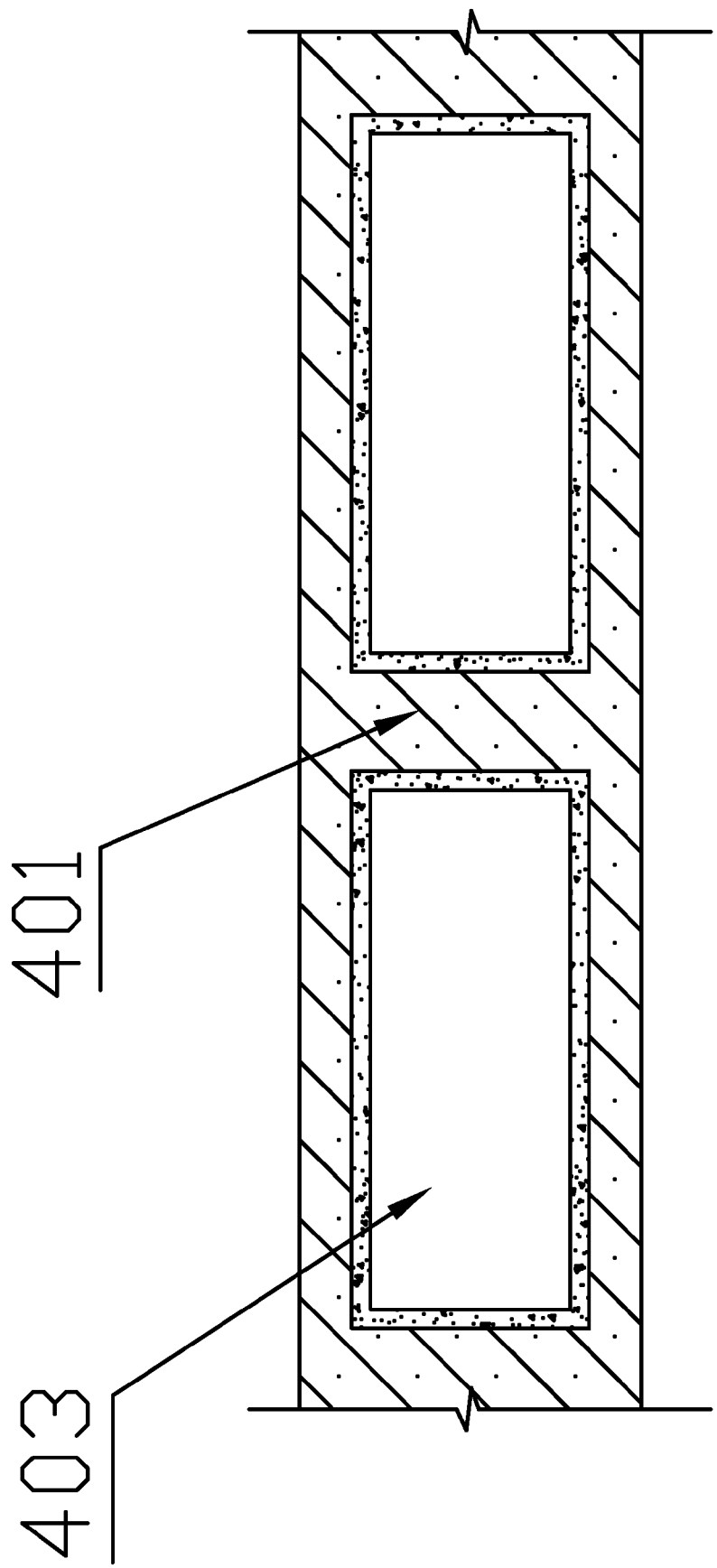
Figure 14C:
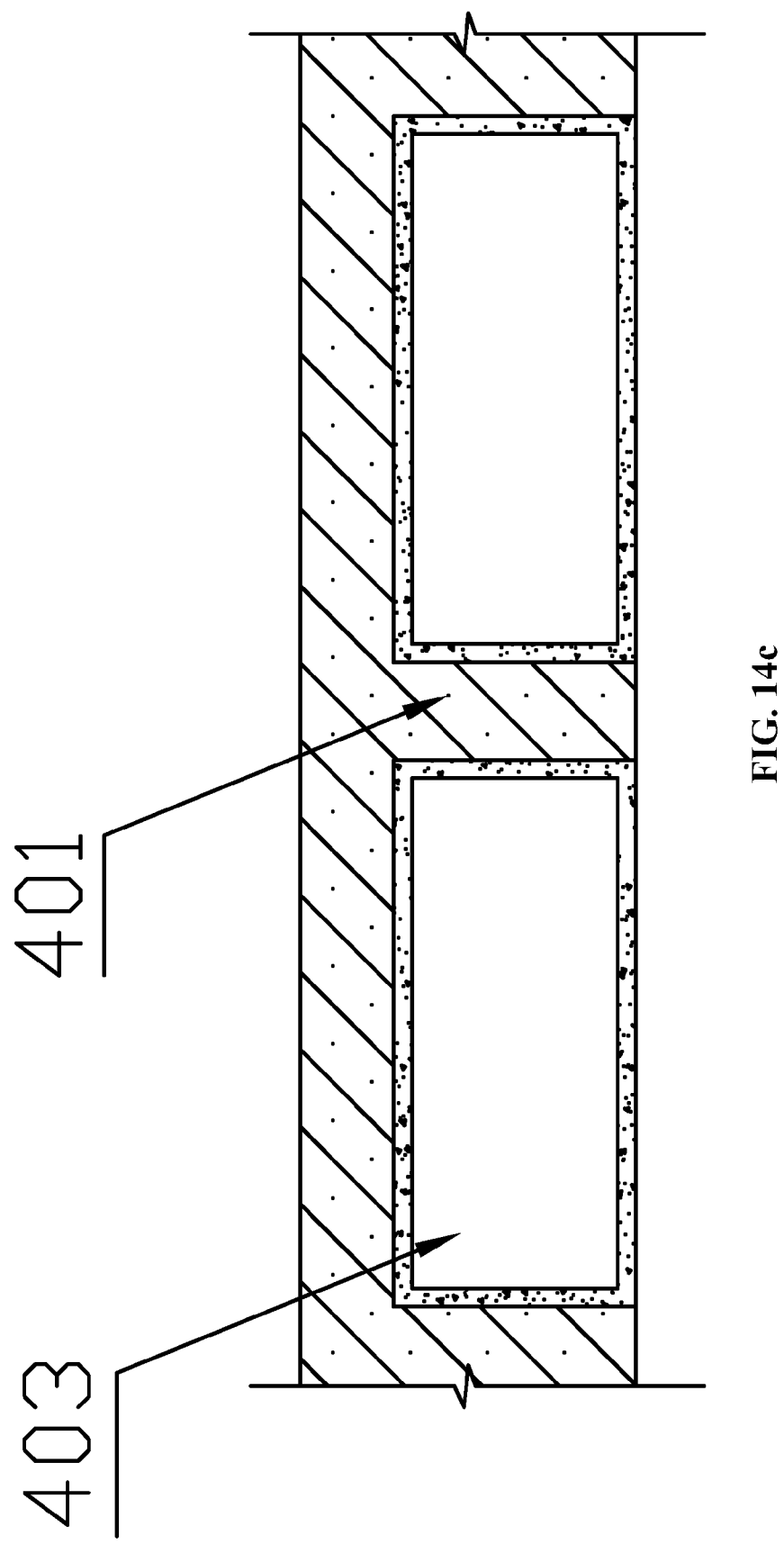
Figure 14D:
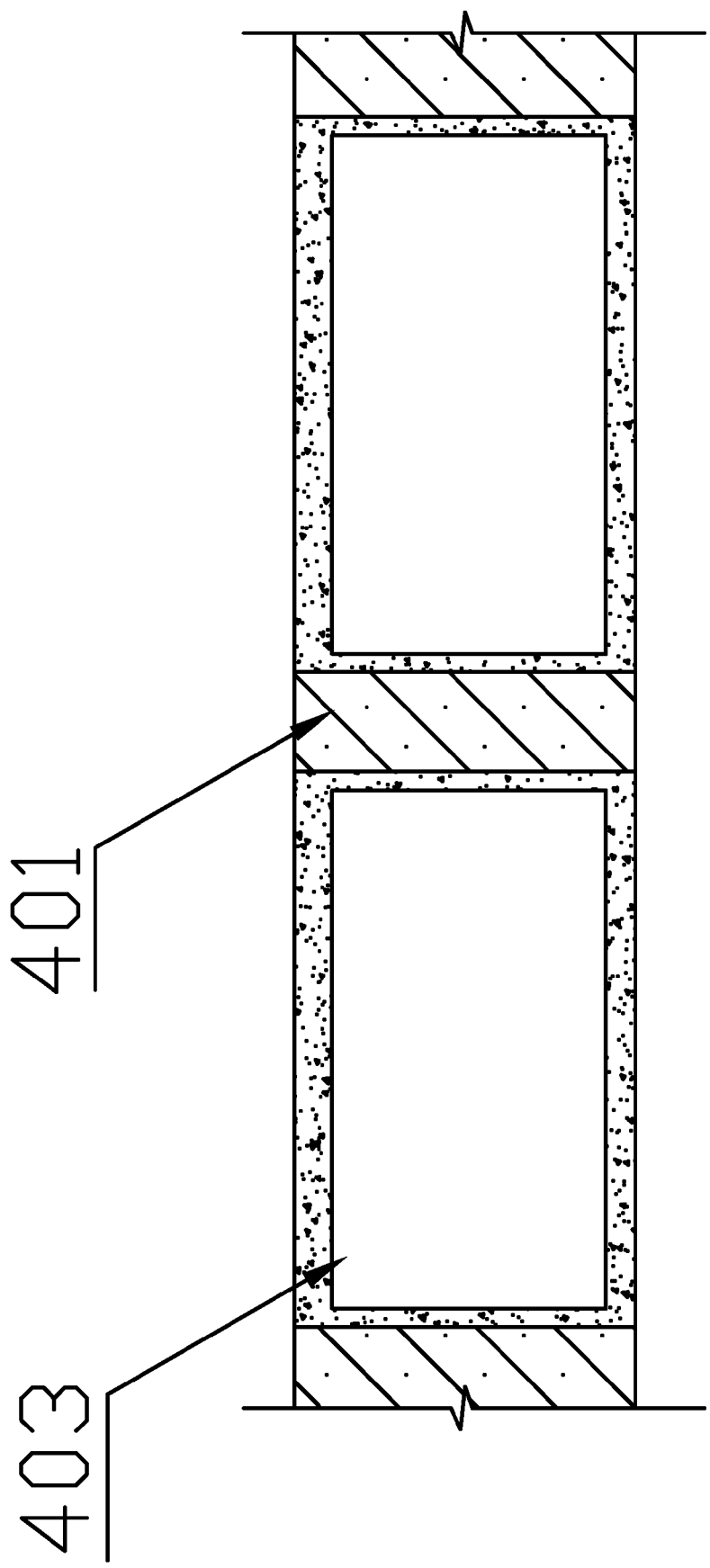

Different approaches used to configure the cavity components 403 in the cavity floor 40 are described below in combination with related figures. Referring to FIG. 14a, the cavity component 403 is located in the upper part of the floor so that the top of the cavity component comprises part of the top of the floor. This configuration requires casting concrete or even concrete reinforced with steel bars and steel wire meshes etc. to the lower part of the cavity component on site. Referring to FIG. 14b, as the cavity component 403 is located in the middle of the floor, it is required to cast concrete or even concrete reinforced with steel bars and steel wire meshes etc. to both upper and lower parts of the cavity component on site. Referring to FIG. 14c, the cavity component 403 is located in the lower part of the floor so that the bottom of the cavity component comprises part of the bottom of the floor. This configuration requires casting concrete or even concrete reinforced with steel bars and steel wire meshes etc. to the upper part of the cavity component on site. Referring to FIG. 14d, as the cavity component 403 runs through the entire floor and the top and bottom of the cavity component respectively comprises part of that of the floor, it is unnecessary to cast any concrete or concrete reinforced with steel bars and steel wire meshes etc. to either upper or lower part of the cavity component on site.

Figure 15:
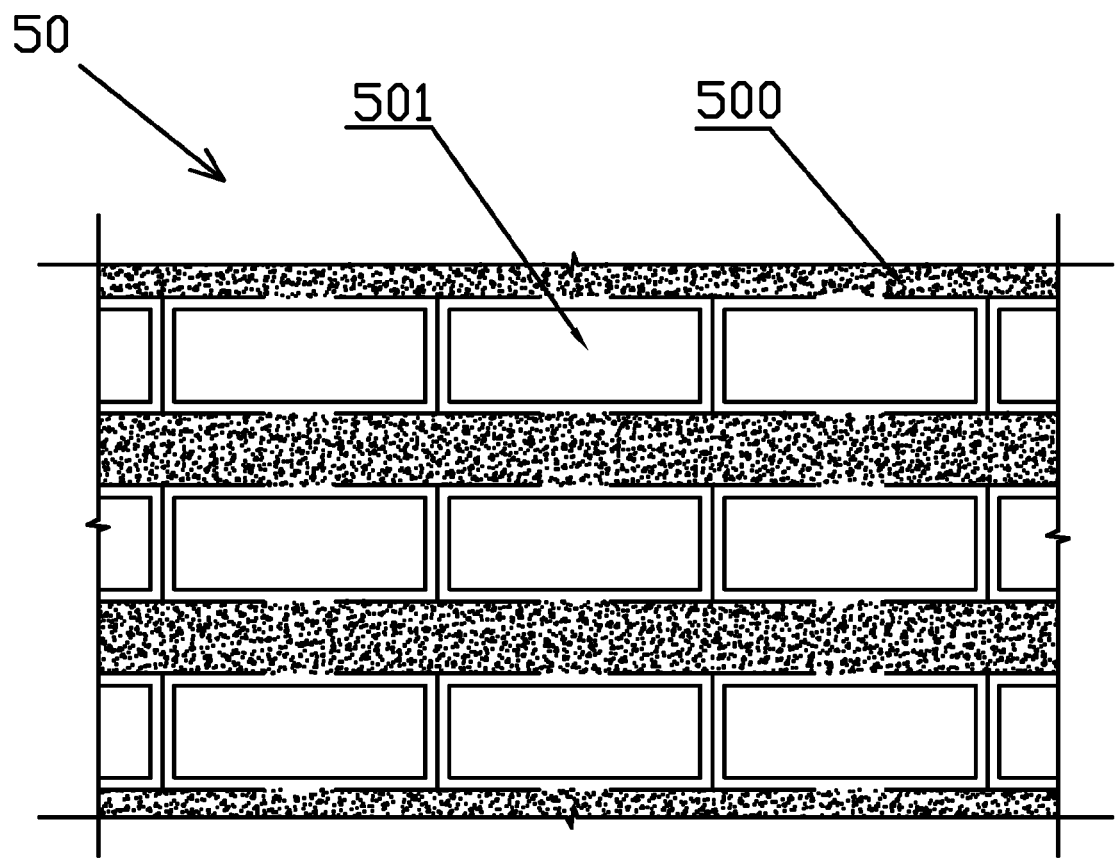
FIG. 15 is a front view of a hollow wall with transverse reinforcing ribs.
Figure 16:
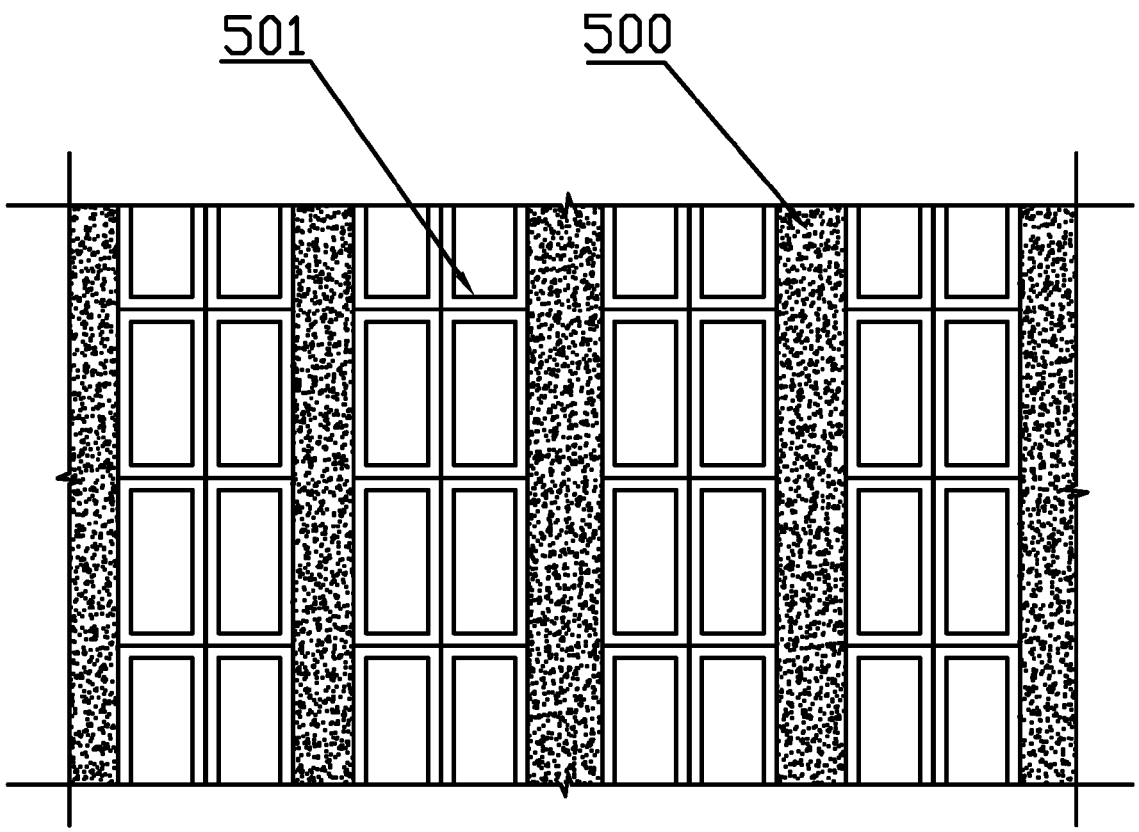
FIG. 16 is a front view of a hollow wall with longitudinal reinforcing ribs.
Figure 17:
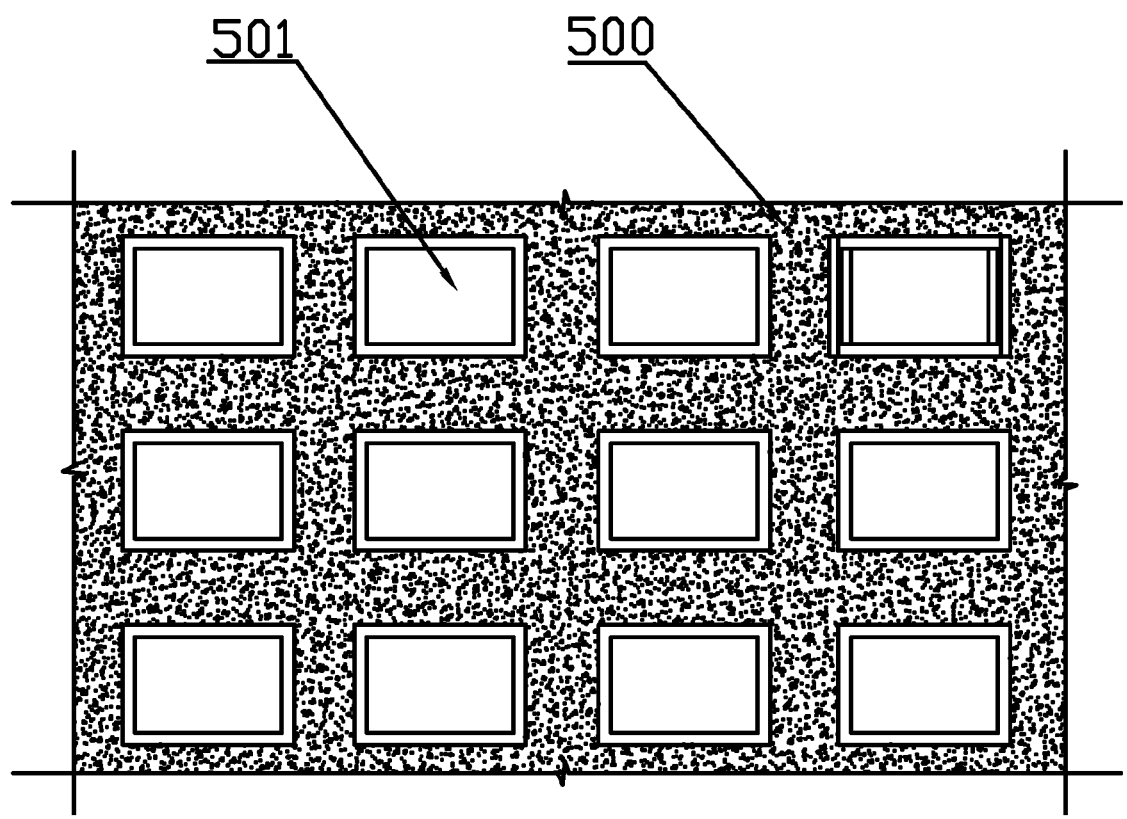
FIG. 17 is a front view of a hollow wall with both transverse and longitudinal reinforcing ribs.

The hollow wall 50 diversifies in terms of structure. Referring to FIG. 15, the hollow wall 50 comprises horizontally-configured reinforcing ribs 500 and cavity components 501 set up between the reinforcing ribs. Referring to FIG. 16, the hollow wall 50 comprises longitudinally-configured reinforcing ribs 500 and cavity components 501 set up between the reinforcing ribs. Referring to FIG. 17, the hollow wall 50 comprises reinforcing ribs 500 configured horizontally and longitudinally and cavity components 501 set up between the reinforcing ribs.

Figure 18A:
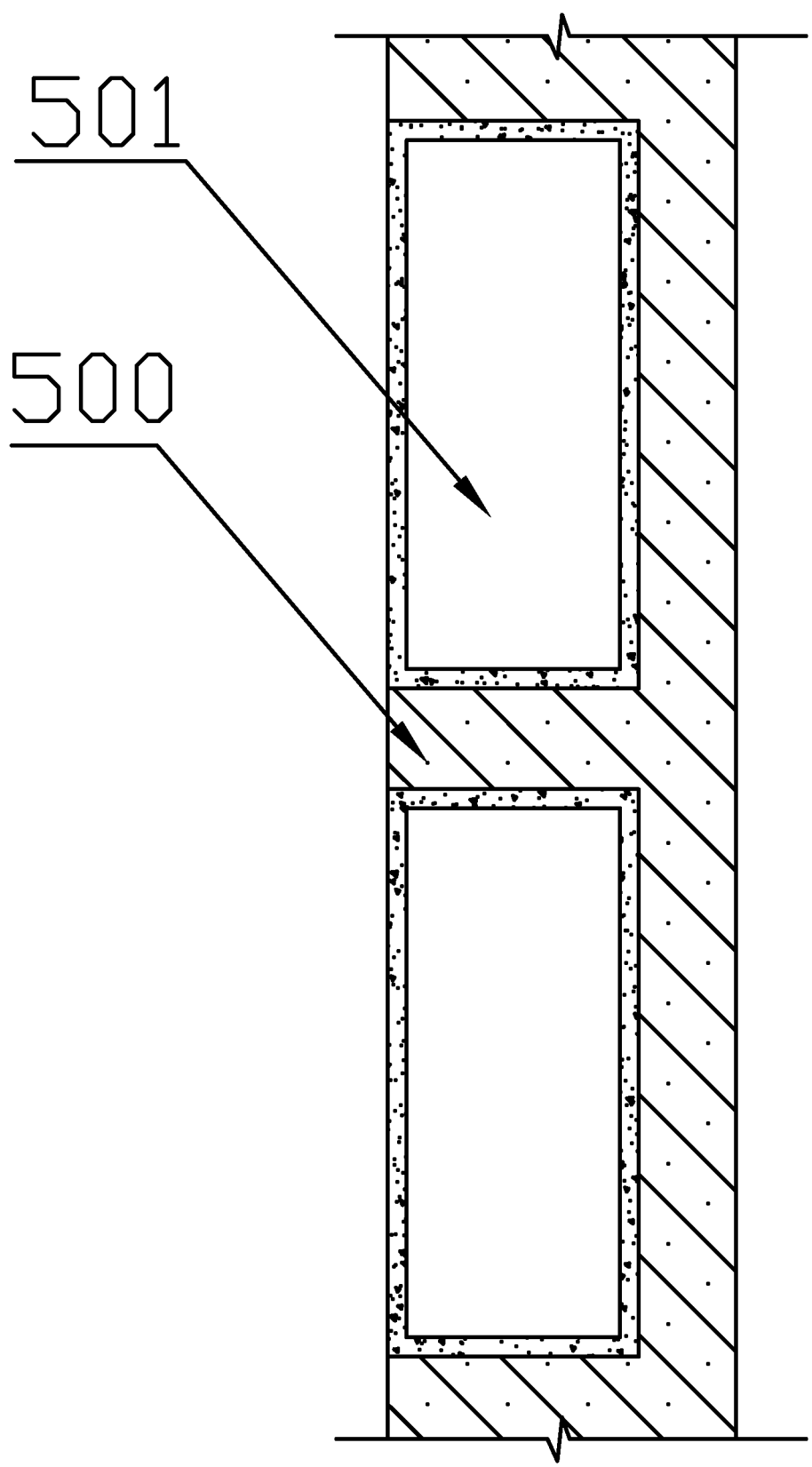
Figure 18B:
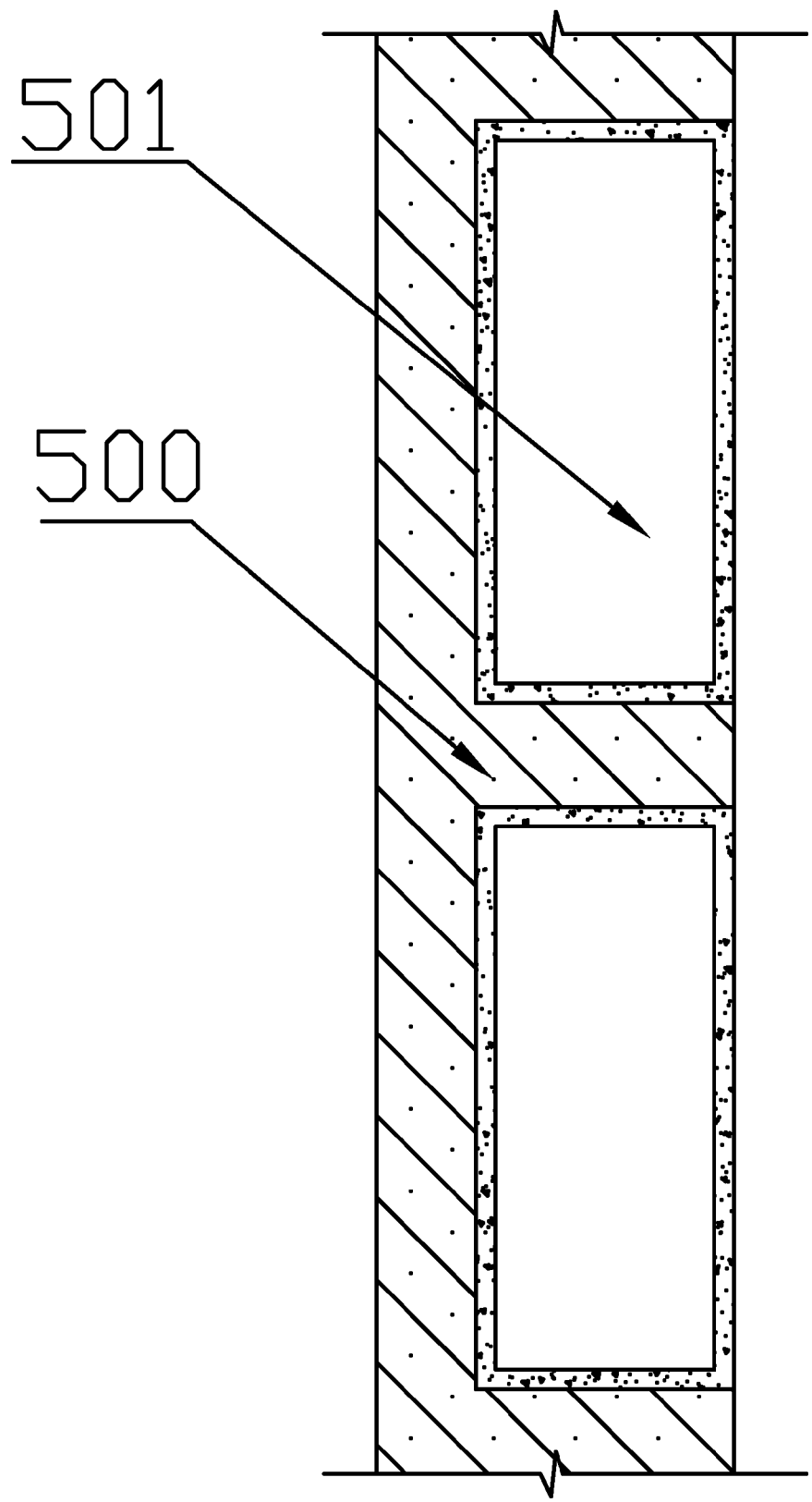
Figure 18C:
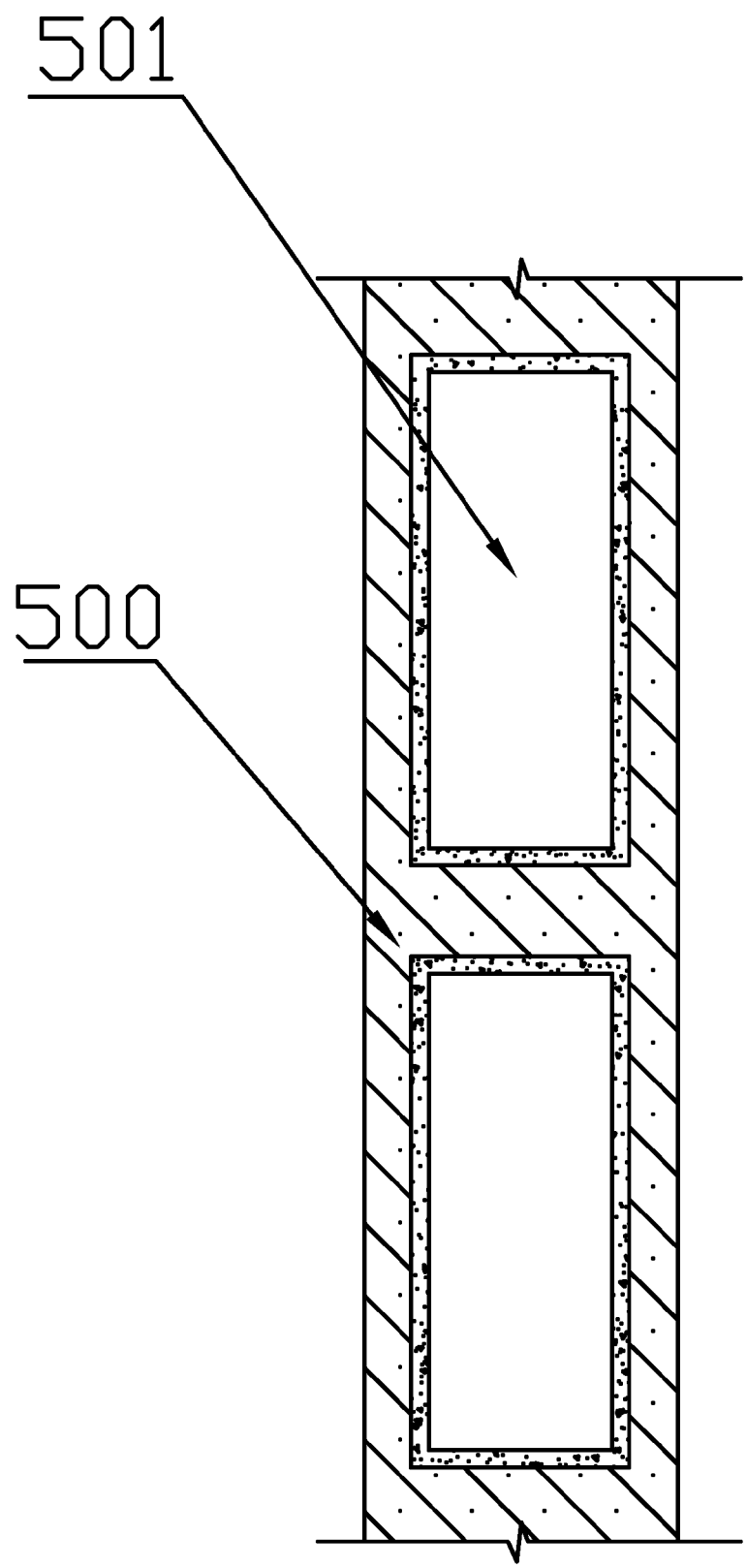
Figure 18D:
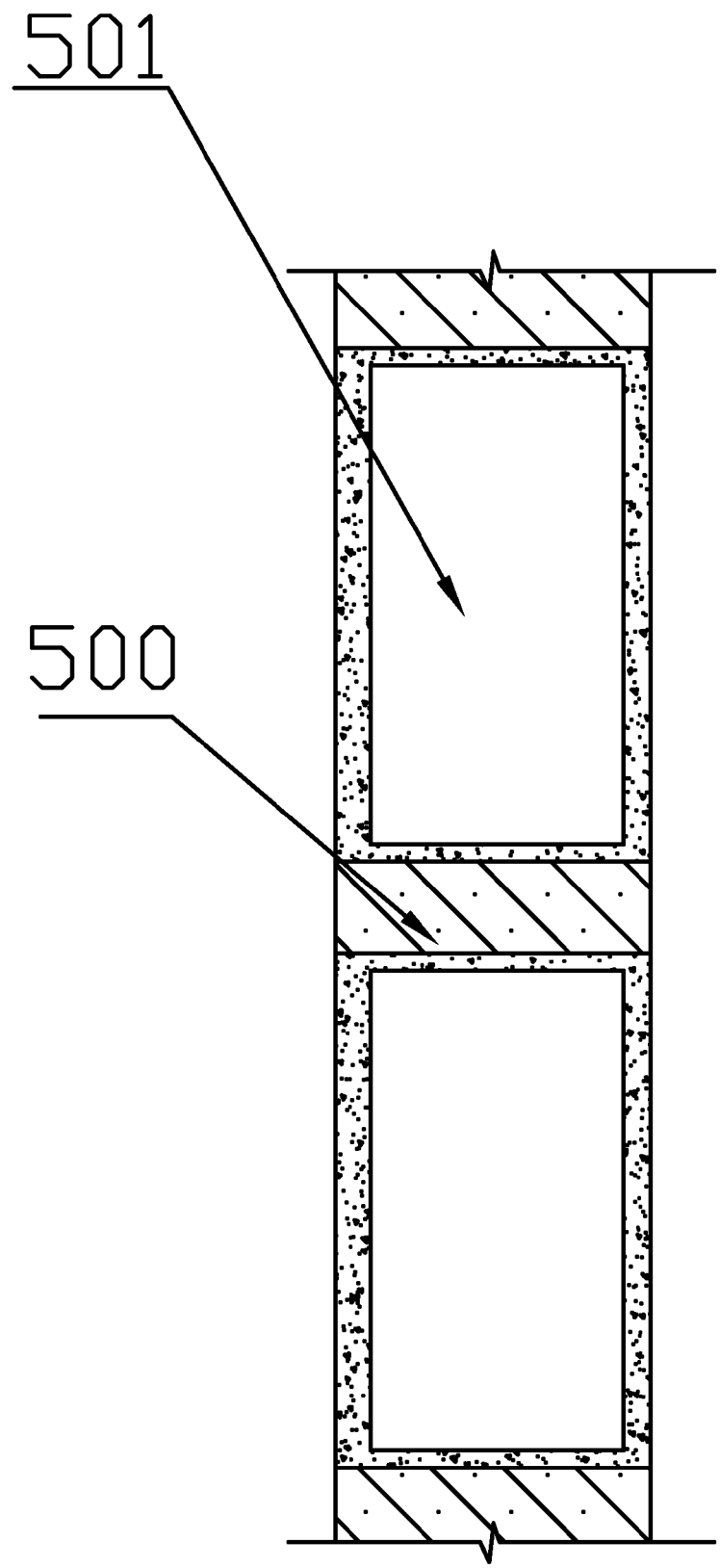

FIGS. 18a-18d specify the situations in which the cavity components 501 are respectively positioned in the external and internal sides, in the belly of the hollow walls 50 as well as penetrate through it. As shown in FIG. 18a, when the cavity components 501 are located in the external side of the hollow walls, it is necessary to put up a layer of wall panels inside; as shown in FIG. 18b, when the cavity components 501 are located in the internal side of the hollow walls, it is necessary to put up a layer of wall panels outside; as shown in FIG. 18c, when the cavity components 501 are located in the belly of the hollow walls, it is necessary to put up a layer of wall panels respectively inside and outside; as shown in FIG. 18d, when the cavity components 501 penetrate through the hollow walls, it is in no need to put up any wall panels.

Figure 19:
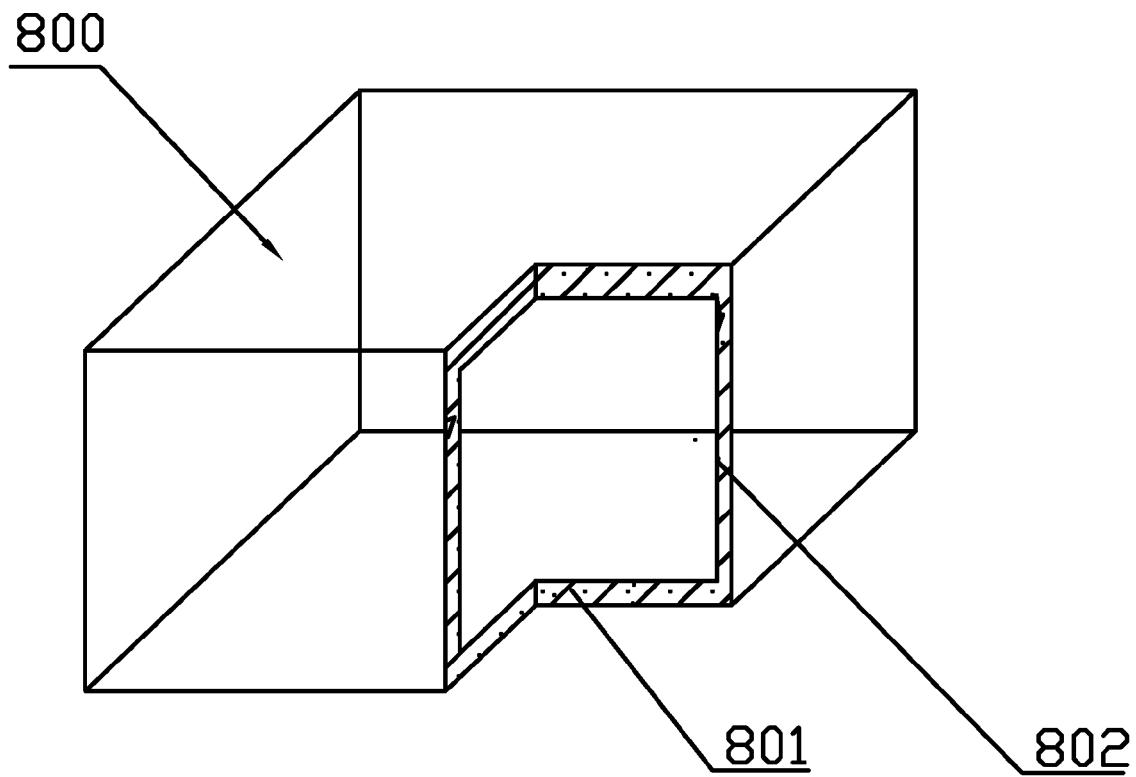
FIG. 19 is a structural view of a cavity component.

Referring to FIG. 19, the cavity component comprises a top panel 800, a bottom panel 801 and side panels 802. When applying the cavity components to the hollow walls 50, the top panel 800, the bottom panel 801 and the side panels 802 respectively locate in the internal side, the external side and inside of the hollow walls 50. What is more, the third is also connected to other side panels 802 or reinforcing ribs 500.

Figure 20:
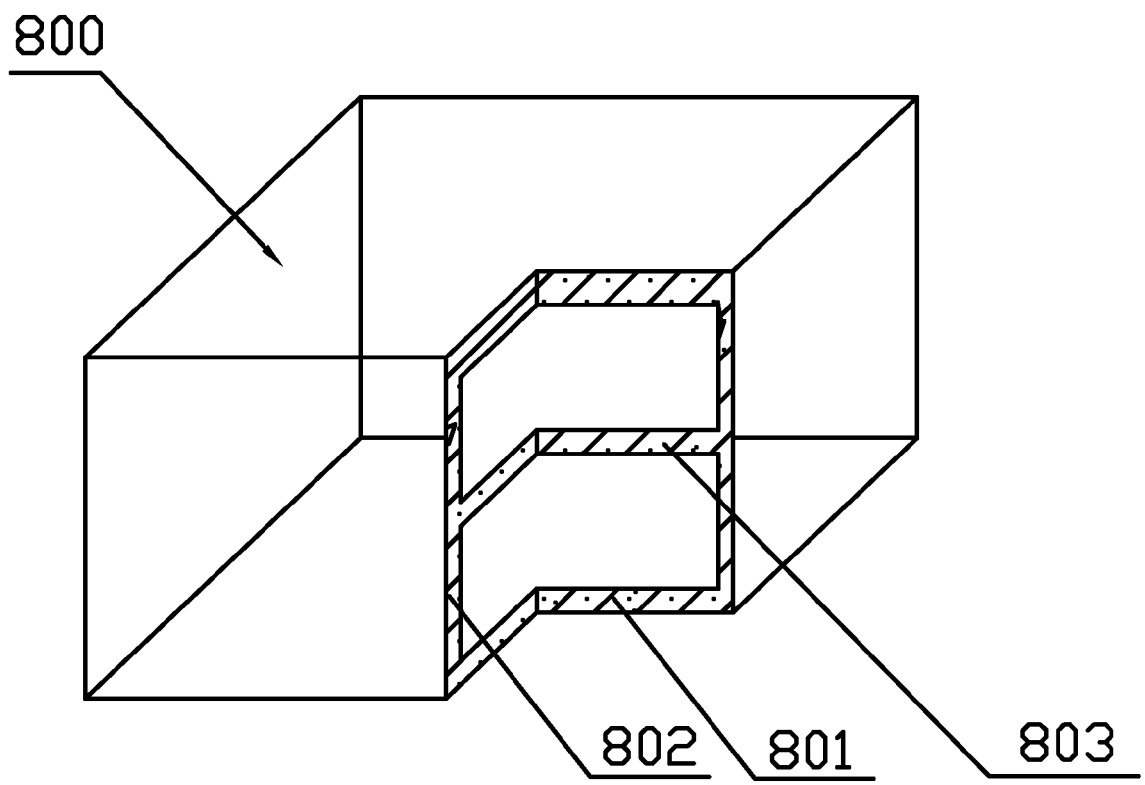
FIG. 20 is a structural view of a cavity component with one layer of partition.

Referring to FIG. 20, between the top panel 800 and the bottom panel 801 of the cavity components there is a partition 803 that divides the cavity formed by the top panel 800, the bottom panel 801 and the side panels 802 into two parts in order to suit various demands, for example, when applying the cavity components to the cavity floor 40, the upper part is used for heating and the lower part for cooling.

Figure 21:
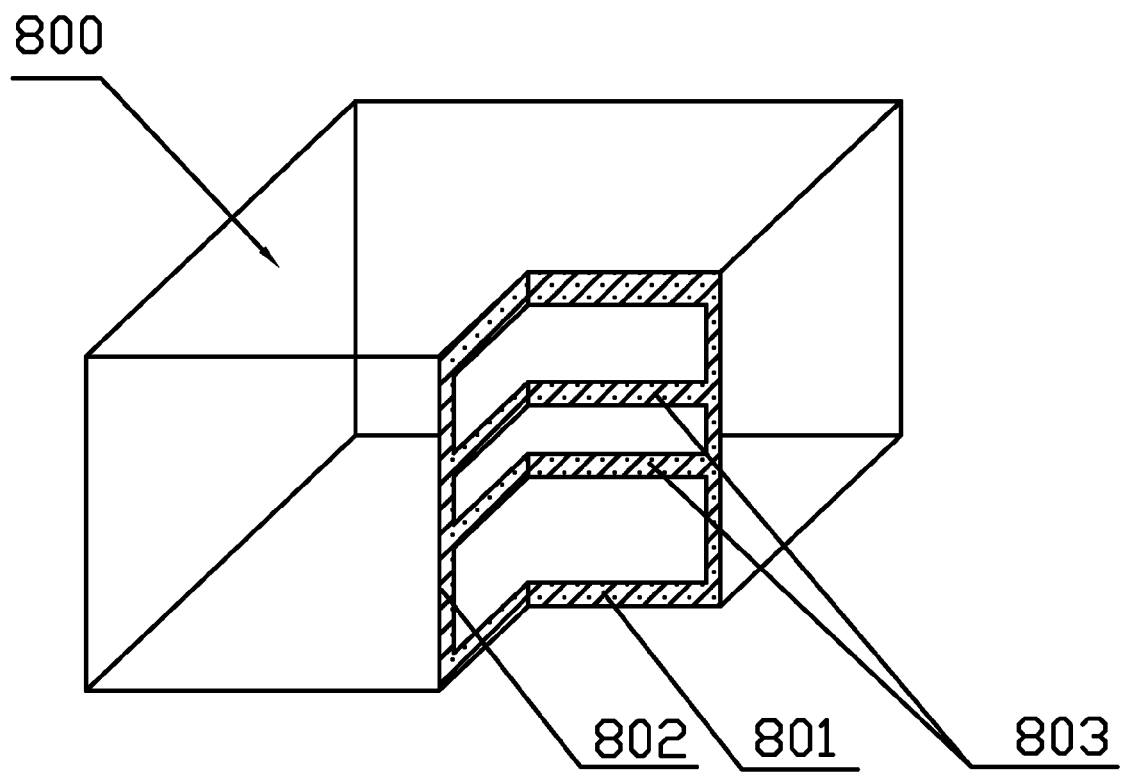
FIG. 21 is a structural view of a cavity component with two layers of partition.

Referring to FIG. 21, between the top panel 800 and the bottom panel 801 of the cavity components there are 2 partitions 803 that divide the cavity formed by the top panel 800, the bottom panel 801 and the side panels 802 into three parts in order to suit various demands, for example, when applying the cavity components to the cavity floor 40, the upper part is used for heating, the lower part for cooling and the middle part for insulation.

As for the cavity components that are high enough, it is required to put at least one partition 803 between the top panel 800 and the bottom panel 801 to boost its rigidity and strength. In addition, the partition 803 added is able to divide the cavity of the cavity components into at least 2 parts, thus facilitating to realize the purpose of separate heating and cooling within the same cavity component, the same floor or the same wall.

Figure 22:
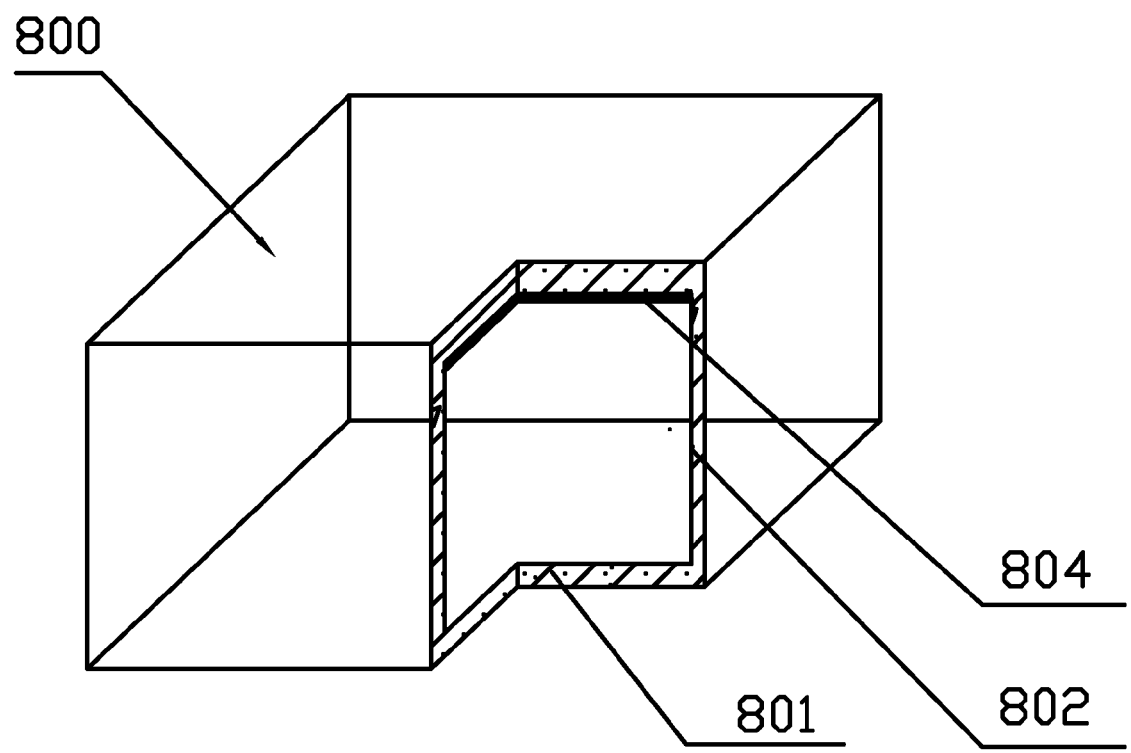
FIG. 22 is a structural view of a cavity component with an insulation layer inside its top panel.

FIG. 22 shows a cavity component with an insulation layer 804 attached to the internal surface of its top panel 800. The component can be used to the outside of a building to reinforce its insulation capability.

Figure 23:
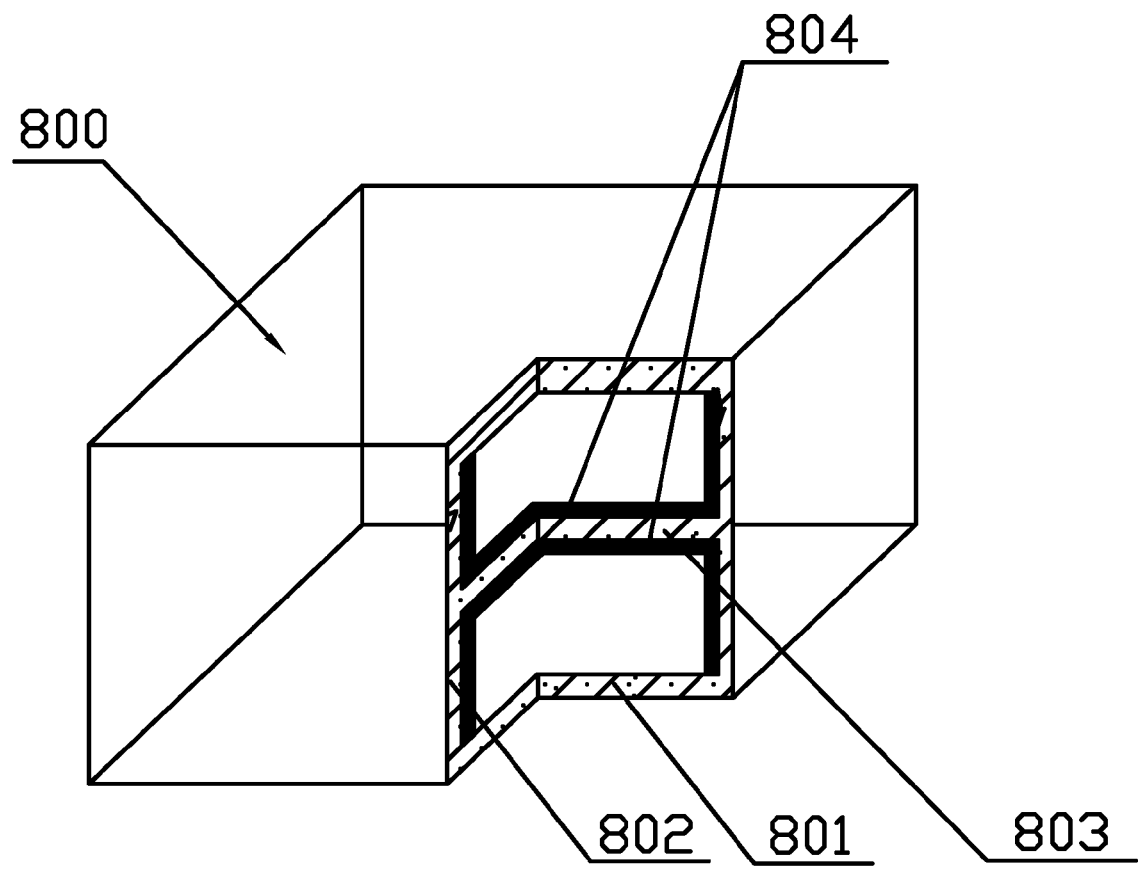
FIG. 23 is a structural view of a cavity component with insulation layers on the surfaces of its top and bottom panels as well as on four side walls.

Referring to FIG. 23, the cavity component has a partition 803 between its top panel 800 and bottom panel 801. Other insulation layers 804 are also mounted to the internal surface of the side panels 803 and the top and bottom of the partition 803. The component is especially suitable for heating and cooling floors so as to strengthen the insulation capability of the floors and improve the utilization efficiency of cold/hot energy.

Figure 24A:
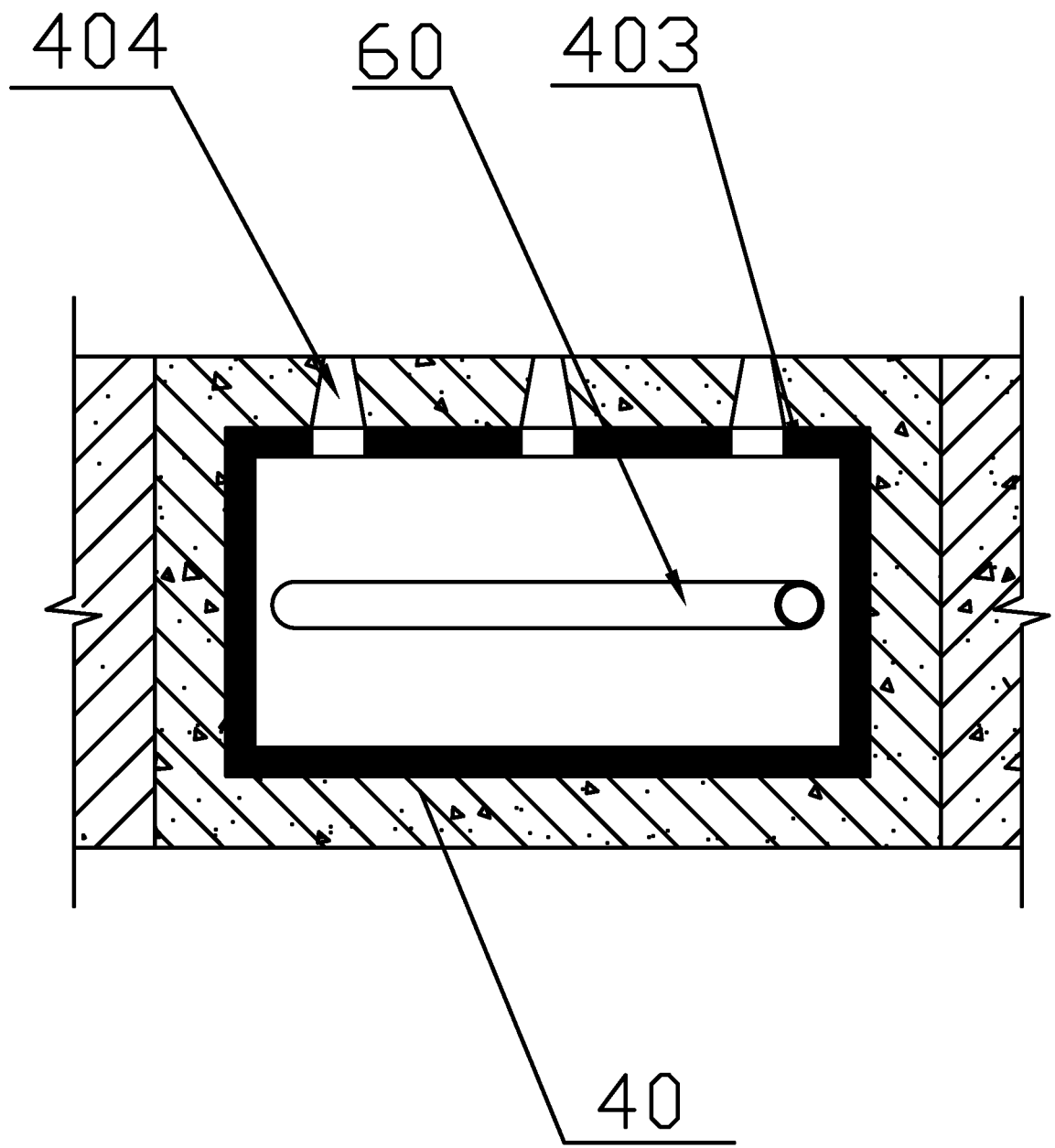
Figure 24B:
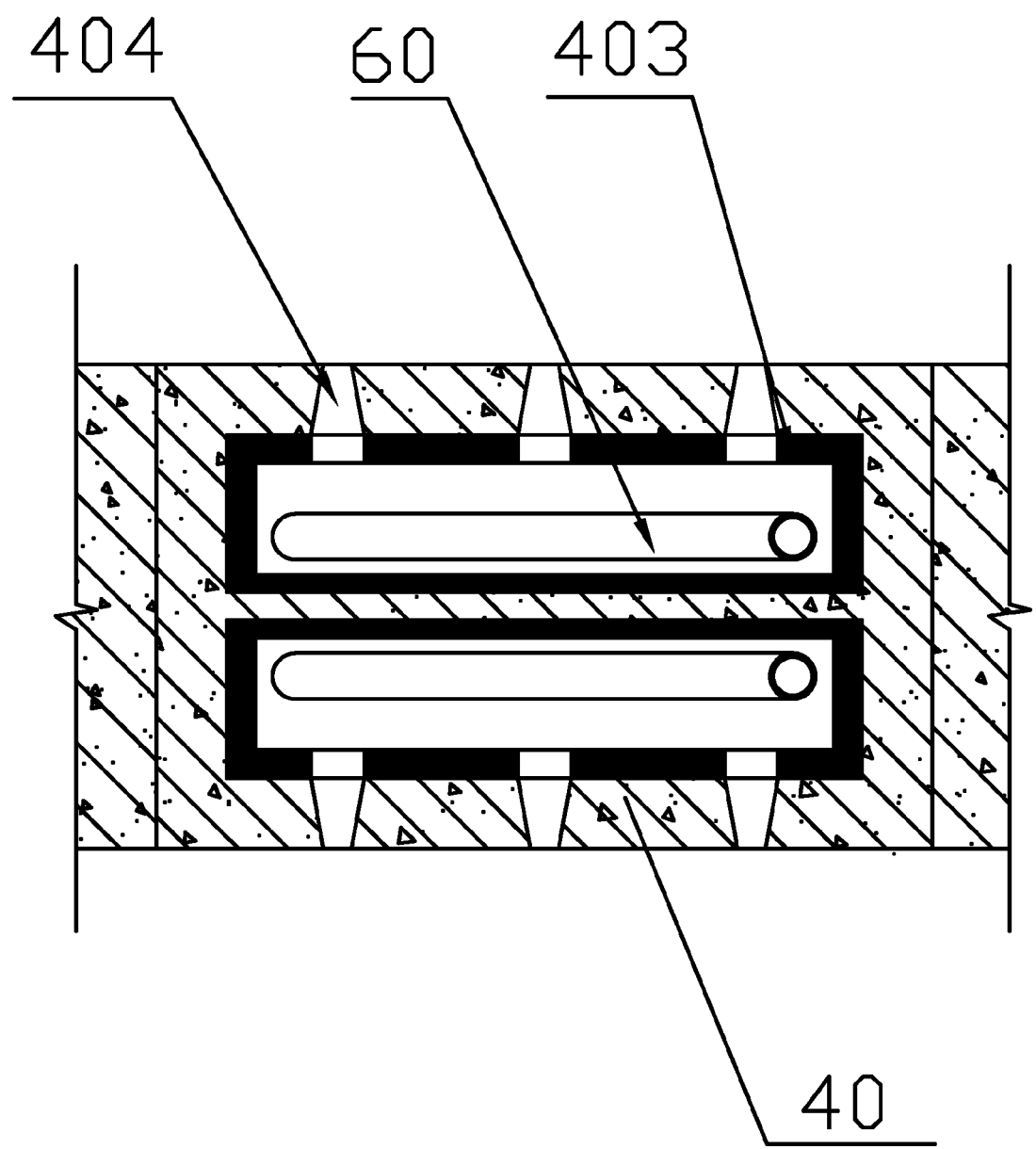

FIGS. 24a-b illustrate the structure of a cavity floor with capillary holes. As shown in FIG. 24a, capillary holes 404 are formed in one side of the cavity floor 40 where the cavity components 403 are located. The cavity floor is applicable to either heating or cooling floors. If capillary holes are opened in the upside of the floor, capillary holes should be formed in the downside of the panels. As shown in FIG. 24b, capillary holes 404 are formed in both sides of the cavity floor 40 where the cavity components 403 are located. The cavity floor is applicable to the heating and cooling floors in the middle stories.

Figure 25A:
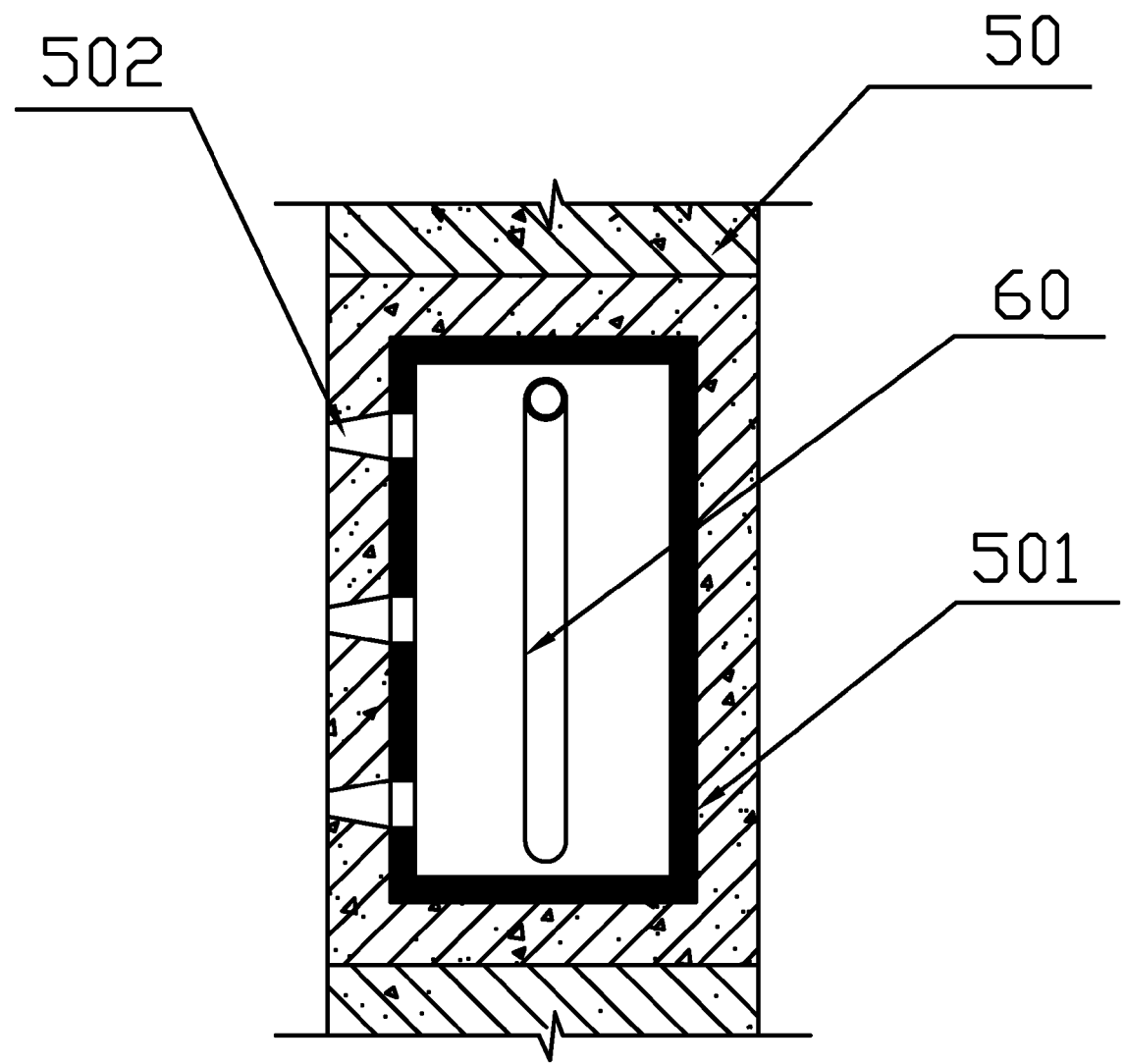
Figure 25B:
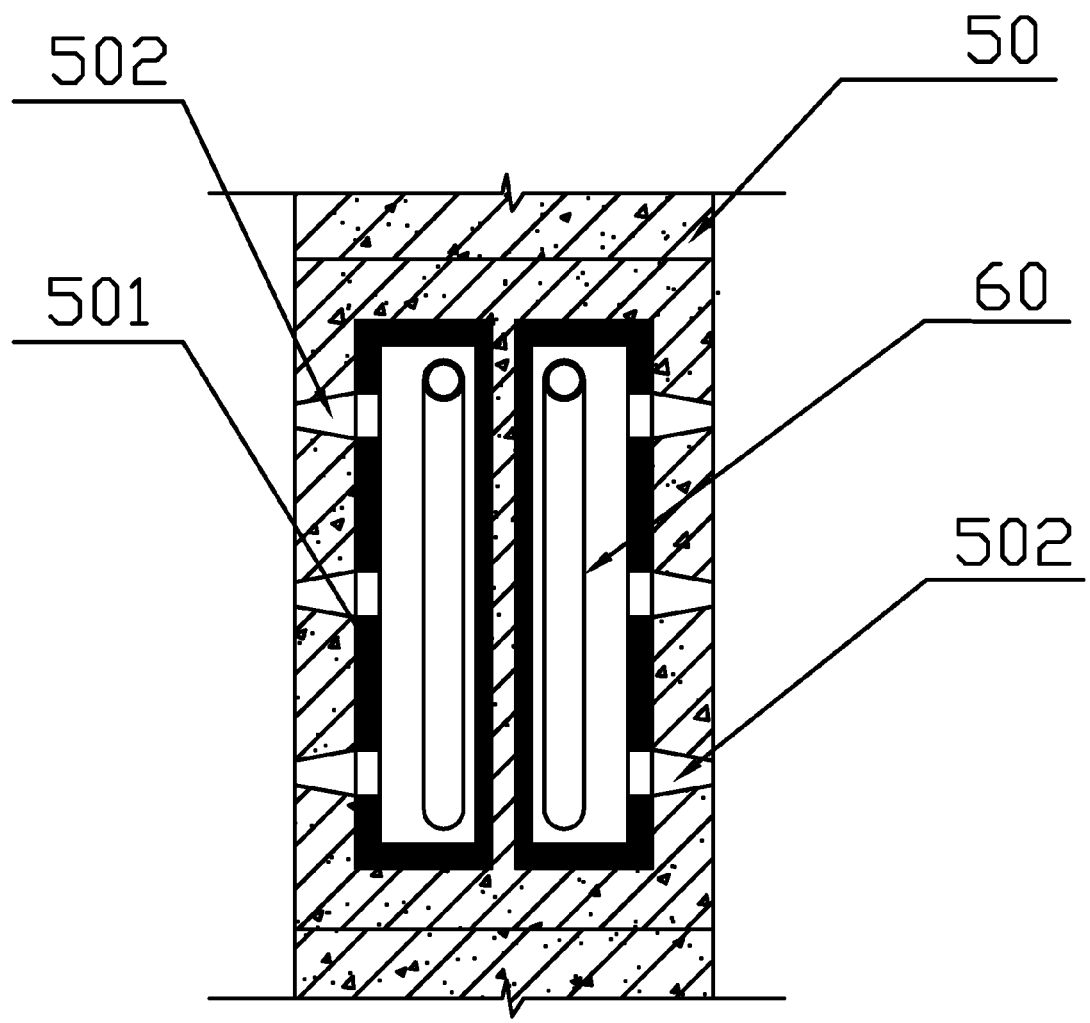

FIGS. 25a-b illustrate the structure of a hollow wall with capillary holes. As shown in FIG. 25a, capillary holes 502 are formed in one side of the hollow walls 50 where the cavity components 501 are located. The hollow wall is applicable to the walls with either heating or cooling demands on one side. As shown in FIG. 25b, capillary holes 502 are formed in both sides of the hollow walls 50 where the cavity components 501 are located. The hollow wall is applicable to the walls with either heating or cooling demands on both sides.

Capillary holes formed in at least one side of the cavity floors 40 or the hollow walls 50 where the cavity components are located facilitate radiation and exchange of energy inside or outside the cavity components.

Figure 26:
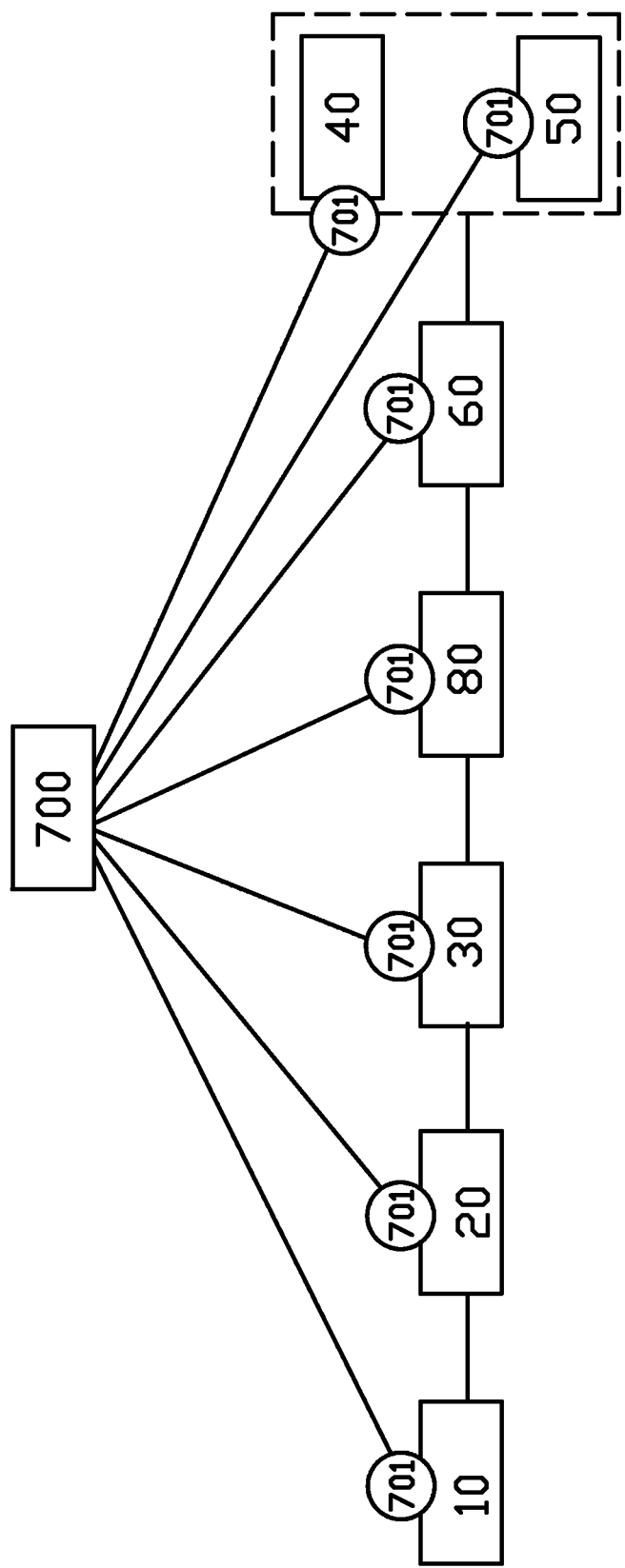
FIG. 26 shows a schematic diagram of an intelligent control unit.

As shown in FIG. 26, the intelligent control unit 70 comprises a computer-controlled unit 700 and sensors 701 that are installed in the solar energy tiles 10, the energy collector 20, the energy converter 30, the cavity floor 40, the hollow wall 50, the supply pipes 60 and the flow medium 80 and then connected to the computer-controlled unit 700. The intelligent control unit 70 monitors the solar energy tiles 10, the energy collector 20, the energy converter 30, the cavity floor 40, the hollow wall 50, the supply pipes 60 and the flow medium 80 in respect of operation process and efficiency, variation, dispatch and allocation, error alarm, self-diagnosis and repair and so on.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A solar energy-powered heating and cooling system for buildings, comprising:
    a) solar energy tiles attached to a roof or an outside surface of walls of a building;
    b) an energy collector used to concentrate solar energy collected by the solar energy tiles;
    c) an energy converter converting the solar energy into another form of energy;
    d) supply pipes hidden inside cavity floor and/or hollow walls and containing a flow medium; and
    e) an intelligent control unit;
wherein the solar energy collected by the solar energy tiles are brought to the energy collector and then converted into another form of energy via the energy converter; and wherein the energy converter comprises an energy converting unit that is connected to the energy collector and an energy output; and wherein said another form o f energy is instilled into the flow medium that is subsequently transferred to the cavity floor and/or hollow walls via the supply pipes so as to either heat up or cool down the building; and wherein the intelligent control unit controls the operations of the solar energy tiles, energy collector, energy converter, supply pipes, cavity floor and/or hollow walls, and the flow medium; and wherein the supply pipe comprises a core pipe, a sleeve outside the core pipe, a connector used to connect the sleeve and the core pipe together, and an air cavity existing between the sleeve and the core pipe, and capillary pipes or sheets are attached to the outside of the core pipe; and wherein the sleeves are disposed on the core pipe along the direction of the flow medium with spacing, and the air cavity is formed individually or in series; and wherein at least one pressurizer is disposed in the air cavity.

2. A solar energy-powered heating and cooling system for buildings, comprising:
    a) solar energy tiles attached to a roof or an outside surface of walls of a building;
    b) an energy collector used to concentrate solar energy collected by the solar energy tiles;
    c) an energy converter converting the solar energy into another form of energy;
    d) supply pipes hidden inside cavity floor and/or hollow walls and containing a flow medium; and
    e) an intelligent control unit;
wherein the solar energy collected by the solar energy tiles are brought to the energy collector and then converted into another form of energy via the energy converter, and wherein the energy converter comprises an energy converting unit that is connected to the energy collector and an energy output; and wherein said another form of energy is instilled into the flow medium that is subsequently transferred to the cavity floor and/or hollow walls via the supply pipes so as to either heat up or cool down the building; and wherein the intelligent control unit controls the operations of the solar energy tiles, energy collector, energy converter, supply pipes, cavity floor and/or hollow walls, and the flow medium; and wherein the supply pipe comprises a core pipe, a sleeve outside the core pipe, a connector used to connect the sleeve and the core pipe together, and an air cavity existing between the sleeve and the core pipe, and capillary pipes or sheets are attached to the outside of the core pipe; and wherein the capillary pipes or sheets change their distribution density in ascending or descending order along the direction of the flow medium.

3. A solar energy-powered heating and cooling system for buildings, comprising:
- a) solar energy tiles attached to a roof or an outside surface of walls of a building;
- b) an energy collector used to concentrate solar energy collected by the solar energy tiles;
- c) an energy converter converting the solar energy into another form of energy;
- d) supply pipes hidden inside cavity floor and/or hollow walls and containing a flow medium; and
- e) an intelligent control unit;

wherein the solar energy collected by the solar energy tiles are brought to the energy collector and then converted into another form of energy via the energy converter; and wherein said another form energy is instilled into the flow medium that is subsequently transferred to the cavity floor and/or hollow walls via the supply pipes so as to either heat up or cool down the building; and the intelligent control unit controls the operations of the solar energy tiles, energy collector, energy converter, supply pipes, cavity floor and/or hollow walls, and the flow medium; and wherein the cavity floor comprises main beams connected end to end forming a frame, secondary beams set up between the main beams in a bidirectional crossing manner, multi-ribbed beams set up between the secondary beams, and cavity components set up between the multi-ribbed beams.

4. A solar energy-powered heating and cooling system for buildings, comprising:
- a) solar energy tiles attached to a roof or an outside surface of walls of a building;
- b) an energy collector used to concentrate solar energy collected by the solar energy tiles;
- c) an energy converter converting the solar energy into another form of energy;
- d) supply pipes hidden inside cavity floor and/or hollow walls and containing a flow medium; and
- e) an intelligent control unit;

wherein the solar energy collected by the solar energy tiles are brought to the energy collector and then converted into another form of energy via the energy converter; and wherein said another form energy is instilled into the flow medium that is subsequently transferred to the cavity floor and/or hollow walls via the supply pipes so as to either heat up or cool down the building; and the intelligent control unit controls the operations of the solar energy tiles, energy collector, energy converter, supply pipes, cavity floor and/or hollow walls, and the flow medium; and wherein the hollow wall comprises horizontally configured, longitudinally configured, or horizontally and longitudinally configured reinforcing ribs and cavity components set up between the reinforcing ribs; the cavity components are positioned in the external, internal sides, the belly of the hollow walls, or penetrate through it; the cavity component comprises a top panel, a bottom panel, and side panels between the top panel and the bottom panel of the cavity component, there is at least one partition that divides the cavity into at least two parts; and the cavity component has at least one insulation attached to at least one of outer or inner surfaces.

5. A solar energy-powered heating and cooling system for buildings, comprising:
- a) solar energy tiles attached to a roof or an outside surface of walls of a building;
- b) an energy collector used to concentrate solar energy collected by the solar energy tiles;
- c) an energy converter converting the solar energy into another form of energy;
- d) supply pipes hidden inside cavity floor and/or hollow walls and containing a flow medium; and
- e) an intelligent control unit;

wherein the solar energy collected by the solar energy tiles are brought to the energy collector and then converted into another form of energy via the energy converter; and wherein said another form energy is instilled into the flow medium that is subsequently transferred to the cavity floor and/or hollow walls via the supply pipes so as to either heat up or cool down the building; and the intelligent control unit controls the operations of the solar energy tiles, energy collector, energy converter, supply pipes, cavity floor and/or hollow walls, and the flow medium; and wherein the hollow wall comprises horizontally configured, longitudinally configured, or horizontally and longitudinally configured reinforcing ribs and cavity components set up between the reinforcing ribs; the cavity components are positioned in the external, internal sides, the belly of the hollow walls, or penetrate through it; the cavity component comprise a top panel, a bottom panel and side panels; between the top panel and the bottom panel of the cavity component, there is at least one partition that divides the cavity into at least two parts; and the cavity component has at least one insulation layer attached to at least one of outer or inner surfaces.

6. A solar energy-powered heating and cooling system for buildings, comprising:
- b) an energy collector used to concentrate solar energy collected by the solar energy tiles;
- c) an energy converter converting the solar energy into another form of energy;
- d) supply pipes hidden inside cavity floor and/or hollow walls and containing a flow medium; and
- e) an intelligent control unit;

wherein the solar energy collected by the solar energy tiles are brought to the energy collector and then converted into another form of energy via the energy converter; and wherein said another form energy is instilled into the flow medium that is subsequently transferred to the cavity floor and/or hollow walls via the supply pipes so as to either heat up or cool down the building; and the intelligent control unit controls the operations of the solar energy tiles, energy collector, energy converter, supply pipes, cavity floor and/or hollow walls, and the flow medium; and wherein the intelligent control unit comprises a computer-controlled unit and sensors that are installed in the solar energy tiles, the energy collector, the energy converter, the cavity floor, the hollow wall, the supply pipes, and the flow medium, and the sensors are connected to the computer-controlled unit.

* * * * *